(12) United States Patent
Chen

(10) Patent No.: US 11,076,313 B2
(45) Date of Patent: Jul. 27, 2021

(54) BASE STATION AND MASTER COMMUNICATION APPARATUS

(71) Applicant: Institute For Information Industry, Taipei (TW)

(72) Inventor: Chiu-Wen Chen, Taipei (TW)

(73) Assignee: Institute For Information Industry, Taipei (TW)

( * ) Notice: Subject to any disclaimer, the term of this patent is extended or adjusted under 35 U.S.C. 154(b) by 129 days.

(21) Appl. No.: 16/693,363

(22) Filed: Nov. 24, 2019

(65) Prior Publication Data

US 2020/0169941 A1     May 28, 2020

Related U.S. Application Data

(60) Provisional application No. 62/771,157, filed on Nov. 25, 2018.

(51) Int. Cl.
*H04W 24/10* (2009.01)
*H04W 28/02* (2009.01)
(Continued)

(52) U.S. Cl.
CPC ....... *H04W 28/0268* (2013.01); *H04W 24/10* (2013.01); *H04W 28/0205* (2013.01);
(Continued)

(58) Field of Classification Search
CPC ........ H04B 7/02–0495; H04B 7/14–17; H04B 17/0082–409; H04J 11/0023–0093;
(Continued)

(56) References Cited

U.S. PATENT DOCUMENTS

2016/0014626 A1   1/2016   Yi et al.
2019/0253915 A1*   8/2019   Joseph .............. H04W 28/0215
(Continued)

OTHER PUBLICATIONS

Office Action to the corresponding Taiwan Patent Application No. 108142566 rendered by the Taiwan Intellectual Property Office (TIPO) dated Oct. 12, 2020, 31 pages.
(Continued)

*Primary Examiner* — Timothy J Weidner
(74) *Attorney, Agent, or Firm* — Skaar Ulbrich Macari, P.A.

(57) ABSTRACT

A base station and a master communication apparatus are provided. The master communication apparatus belongs to a mobile communication system. The mobile communication system includes a plurality of data transmission apparatuses. Each of the data transmission apparatuses has a transmission path with a user equipment individually. Each transmission path has a priority degree. The master communication apparatus selects one of the transmission paths as the primary path. For each of a plurality of QoS degrees, the master communication apparatus selects a set of the transmission paths as at least one duplication path of the QoS degree according to the priority degrees and/or a plurality of communication service statuses. The master communication apparatus configures a MAC logic channel parameter and configures at least one PDCP parameter. The master communication apparatus transmits the MAC logic channel parameter and the at least one PDCP parameter to the user equipment.

26 Claims, 14 Drawing Sheets

| QoS degrees | Transmission path as the primary data path | Transmission paths as duplication data paths | Transmission paths as activated duplication data paths |
|---|---|---|---|
| Q1 | L1 | L2、L3、L4 | L2、L3 |
| Q2 | L1 | L5、L6 | L6 |
| Q3 | L1 | L6、L7 | L6、L7 |
| Q4 | L1 | L5、L6、L7 | L5、L7 |
| Q5 | L1 | L3、L4、L5、L7 | L3、L4、L5、L7 |

(51) Int. Cl.
*H04W 28/08* (2009.01)
*H04W 40/12* (2009.01)
*H04W 76/15* (2018.01)
*H04W 80/02* (2009.01)
*H04W 84/04* (2009.01)
*H04W 88/08* (2009.01)
*H04W 88/12* (2009.01)
*H04W 92/02* (2009.01)
*H04W 92/10* (2009.01)
*H04W 92/12* (2009.01)
*H04W 92/20* (2009.01)

(52) U.S. Cl.
CPC ... *H04W 28/0231* (2013.01); *H04W 28/0247* (2013.01); *H04W 28/0252* (2013.01); *H04W 28/085* (2013.01); *H04W 28/0815* (2020.05); *H04W 28/0967* (2020.05); *H04W 40/12* (2013.01); *H04W 76/15* (2018.02); *H04W 80/02* (2013.01); *H04W 84/04* (2013.01); *H04W 88/08* (2013.01); *H04W 88/12* (2013.01); *H04W 92/02* (2013.01); *H04W 92/10* (2013.01); *H04W 92/12* (2013.01); *H04W 92/20* (2013.01)

(58) Field of Classification Search
CPC . H04L 5/003–0098; H04L 45/24–245; H04W 24/02–10; H04W 28/02–26; H04W 40/005–38; H04W 72/005–14; H04W 74/002–008; H04W 76/10–50; H04W 80/02; H04W 84/02–047; H04W 84/18–22; H04W 88/005–188; H04W 92/02–24

See application file for complete search history.

(56) References Cited

U.S. PATENT DOCUMENTS

2020/0351700 A1* 11/2020 Han .................. H04W 28/0268
2021/0014728 A1* 1/2021 Kuo .................. H04W 28/0263

OTHER PUBLICATIONS

3GPP, "Technical Report 3rd Generation Partnership Project; Technical Specification Group Radio Access Network; Study on Integrated Access and Backhaul; (Release 15)", 3GPP TR 38.874 V0.6.2 (Nov. 2018) Nov. 5, 2018, 91 pages.

* cited by examiner

| QoS degrees | Transmission path as the primary data path | Transmission paths as duplication data paths | Transmission paths as activated duplication data paths |
|---|---|---|---|
| Q1 | L1 | L2、L3、L4 | L2、L3 |
| Q2 | L1 | L5、L6 | L6 |
| Q3 | L1 | L6、L7 | L6、L7 |
| Q4 | L1 | L5、L6、L7 | L5、L7 |
| Q5 | L1 | L3、L4、L5、L7 | L3、L4、L5、L7 |

FIG. 1D

BASE STATION AND MASTER COMMUNICATION APPARATUS

PRIORITY

This application claims priority to U.S. Provisional Patent Application No. 62/771,157 filed on Nov. 25, 2018, which is hereby incorporated by reference in its entirety.

FIELD

The present invention relates to a base station and a master communication apparatus. In particular, the present invention relates to a base station and a master communication apparatus that are capable of selectively determining duplication paths.

BACKGROUND

The fifth generation of mobile communication technology adopts New Radio (NR) as the wireless access technology, and one characteristic of which is that a user equipment (UE) may establish multiple transmission paths (also known as legs). Generally speaking, the user equipment attaches to a master communication apparatus (which may be a base station or a hardware equipment at the base station side, e.g., a centralized unit (CU)) firstly, and the master communication apparatus then performs reconfiguration for the user equipment in the data transmission stage. Thereby, the user equipment can transmit and receive data through multiple transmission paths at the same time.

Although the New Radio of the fifth generation of mobile communication technology allows a user equipment to establish multiple transmission paths, the current specification of the standard only provides a solution for a user equipment having two transmission paths regarding the objective of improving the reliability of data transmission without increasing modulation and coding pressure at the lower layer of a communication protocol stack. According to the aforesaid solution, a packet is duplicated into two copies at the upper layer of the communication protocol stack (i.e., the packet data convergence protocol duplication (PDCP duplication) is applied to the packet) and the two copies of the packet are then transmitted through all the transmission paths (i.e., two transmission paths). If the aforesaid solution is directly applied to the scenario that a user equipment has more than two transmission paths, every packet will be duplicated into multiple copies (the number of copies depends on the number of transmission paths) and then transmitted through all the transmission paths, which causes serious waste of system resources. Therefore, for the scenario that a user equipment has more than two transmission paths, a solution that can improve the reliability of data transmission without wasting system resources and without increasing modulation and coding pressure at the lower layer of the communication protocol stack is still unavailable.

Some industries have strict requirements regarding data transmission (e.g., Industrial Internet of Things (IIoT) requires data transmission to be superior to Ultra-Reliable and Low Latency Communications (URLLC)), and such strict requirements cannot be met if a packet is only duplicated into two copies and then through two transmission paths. Therefore, for the scenario that a user equipment has more than two transmission paths, it is an urgent issue to improve the reliability of data transmission without wasting system resources and without increasing modulation and coding pressure at the lower layer of the communication protocol.

Furthermore, the current specification of the fifth generation of mobile communication technology has some other deficiencies. Regarding resource allocation at the lower layer of the communication protocol stack, the current specification of the fifth generation of mobile communication technology provides two approaches, including the configured grant and the dynamic grant. Adopting the configured grant means periodically allocating resources to a user equipment, while adopting the dynamic grant means allocating resources to a user equipment only when there is data to be transmitted. If the configured grant is adopted, it is possible that no packet needs to be transmitted at the time that some resources have been allocated. In that case, resources in the lower layer are wasted. If the configured grant and the dynamic grant are both adopted, it is possible that resource allocation of the dynamic grant conflict with resource allocation of the configured grant.

According to the above description, for the scenario that a user equipment has more than two transmission paths, how to meet the high requirements of ultra-reliability and low delay communications without wasting system resources and without increasing modulation and coding pressure at the lower layer of the communication protocol stack is a technical problem that must be solved by the fifth generation of mobile communication technology. In addition, how to reduce the resource waste and resource conflict at the lower layer of the communication protocol stack is another technical problem that must be solved by the fifth generation of mobile communication technology.

SUMMARY

Provided is a master communication apparatus, wherein the master communication apparatus belongs to a mobile communication system. The mobile communication system comprises a plurality of data transmission apparatuses, each of the data transmission apparatuses has a transmission path with a user equipment individually, and each of the transmission paths has a priority degree. The master communication apparatus comprises a transceiving interface and a processor, which are electrically connected with each other. The processor selects one of the transmission paths as a primary path. For each of a plurality of Quality of Service (QoS) degrees, the processor individually selects a set of the transmission paths as at least one duplication path of the QoS degree according to at least one of a first parameter set and a second parameter set, wherein the first parameter set comprises the priority degrees and the second parameter set comprises a communication service status of each of the at least one data transmission apparatus. The processor further configures a Medium Access Control (MAC) logic channel parameter and configures at least one Packet Data Convergence Protocol (PDCP) parameter. The transceiving interface transmits the at least one PDCP parameter and the MAC logic channel parameter to the user equipment.

Also provided is a base station, wherein the base station comprises a master communication apparatus and a plurality of data transmission apparatuses. Each of the data transmission apparatuses has a transmission path with a user equipment individually and each of the transmission paths has a priority degree. The master communication apparatus selects one of the transmission paths as a primary path. For each of a plurality QoS degrees, the master communication apparatus individually selects a set of the transmission paths as at least one duplication path of the QoS degree according to at least one of a first parameter set and a second parameter set, wherein the first parameter set comprises the priority degrees and the second parameter set comprises a communication service status of each of the at least one data transmission apparatus. The master communication apparatus further configures a MAC logic channel parameter, configures at least one PDCP parameter, and transmits the at least one PDCP parameter and the MAC logic channel parameter to the user equipment.

For a user equipment with more than two transmission paths in the fifth generation of mobile communication technology, the master communication apparatus selects one of the transmission paths as a primary path. For different QoS degrees, the master communication apparatus individually selects a set of the transmission paths as at least one duplication path. After the master communication apparatus has determined the duplication paths corresponding to each of the QoS degrees for the user equipment, the master communication apparatus of the present invention may further determine which duplication path(s) will be activated for each of the QoS degrees (for each QoS degree, it is possible that all of or part of the corresponding duplication paths will be activated). When a packet of a data stream needs to be transmitted to the user equipment, the master communication apparatus of the present invention will determine the duplication path that will be actually adopted from the activated duplication paths according to the QoS degree of the data stream (it is possible that all of or part of the activated duplication paths will be selected as the duplication path(s) that is/are actually adopted). Each packet that has be transmitted will be duplicated into multiple copies, and these copies will be transmitted to the user equipment by the primary path (if the instant service status of the primary path is acceptable) and the actually adopted duplication path respectively.

The master communication apparatus makes it possible that not all the transmission paths allocated to the user equipment are selected as the actually adopted duplication paths. Therefore, the strict requirements of ultra-reliability and low delay communications can be achieved without wasting system resources. In addition, the master communication apparatus individually determines the duplication paths and the subsequent activation and adoption of these duplication paths for different QoS degrees. It is possible that the duplication paths corresponding to different QoS degrees are not all the same and the subsequent activations and/or adoptions of duplication paths are not all the same. Hence, resource waste and resource conflict at the lower layer of the communication protocol stack can be reduced. Furthermore, since the master communication apparatus can duplicate a packet into a plurality of copies at the upper layer of the communication protocol stack and then transmits these packets through the primary path and the duplication paths, modulation and coding pressure at the lower layer of the communication protocol stack will not be increased.

The detailed technology and preferred embodiments implemented for the subject invention are described in the following paragraphs accompanying the appended drawings for people skilled in this field to well appreciate the features of the claimed invention.

BRIEF DESCRIPTION OF THE DRAWINGS

FIG. 1D depicts a specific example of different Quality of Service (QoS) degrees and their corresponding duplication paths and activated duplication paths;

FIG. 4B depicts a schematic view of the CU-CP apparatus 41a;

DETAILED DESCRIPTION

Figure 1A:
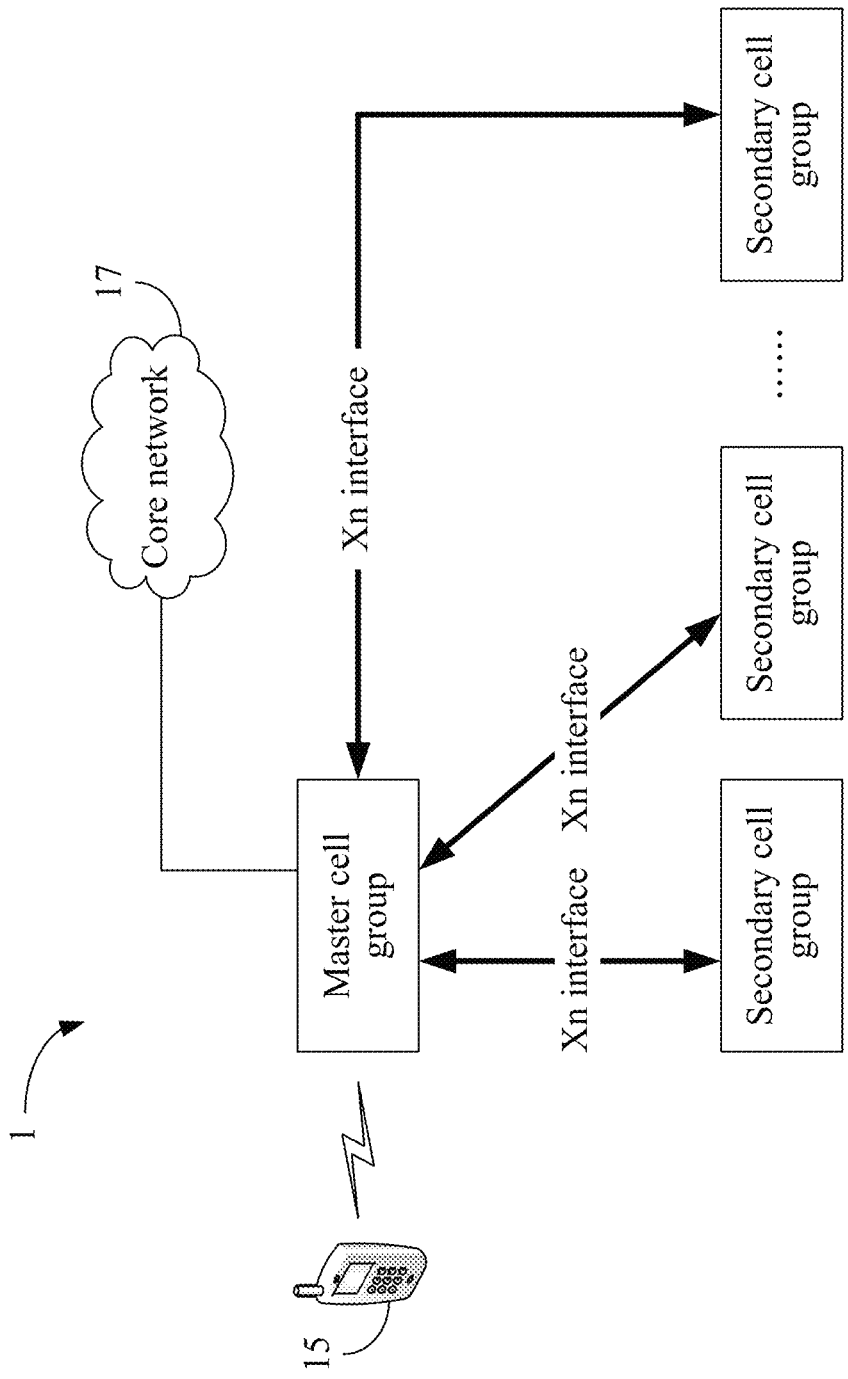
FIG. 1A depicts a schematic view of a part of the mobile communication system 1.

In the following description, a base station and a master communication apparatus will be explained with reference to certain example embodiments thereof. However, these example embodiments are not intended to limit the present invention to any specific environment, example, applications, embodiments or implementations described in these example embodiments. Therefore, description of these example embodiments is only for purpose of illustration rather than to limit the scope of the present invention.

It should be appreciated that, in the following embodiments and the attached drawings, elements unrelated to the present invention are omitted from depiction. Furthermore, dimensions of elements and dimensional proportions among individual elements in the attached drawings are provided only for ease of depiction and illustration, but not to limit the scope of the present invention.

In some embodiments (e.g., the first embodiment) of the present invention, the mobile communication system comprises a plurality of data transmission apparatuses belonging to the base station side and one of the data transmission apparatuses serves as a master communication apparatus. In other embodiments (e.g., the second to the fifth embodiments) of the present invention, the mobile communication system comprises a plurality of data transmission apparatuses belonging to the base station side and another master communication apparatus which also belongs to the base station side.

If a user equipment (UE) wants to join in the mobile communication system, the user equipment attaches to the master communication apparatus first. The master communication apparatus then reconfigures the user equipment so that a transmission path is individually established between the user equipment and each of the data transmission apparatuses. Each of the transmission paths has a priority degree, wherein these priority degrees are determined based on pieces of communication measurement information measured by the user equipment and/or the default priority levels of the 5G QoS Indicator (5QI). It shall be noted that each piece of the communication measurement information may be any information that can be measured by the user equipment and can reflect the communication quality of a transmission path. For example, each piece of communication measurement information may include a Received Signal Strength Indication (RSSI), a Reference Symbol Received Power (RSRP), and/or a Reference Signal Receiving Quality (RSRQ), but it is not limited thereto.

Please note that, in some embodiments of the present invention, the priority degree of each transmission path is determined by the master communication apparatus. Yet, in other embodiments of the present invention, the priority degree of each transmission path is determined by the core network and the core network then notifies the master communication apparatus of the determination result. The present invention does not limit the way that the master communication apparatus/the core network determines the priority degrees of the transmission paths according to the communication measurement information. For example, the master communication apparatus/the core network may set the priority degree of the transmission path with better communication quality to a higher one (i.e., set the transmission path with better communication quality to have a higher priority) according to the communication measurement information.

The master communication apparatus selects one of the transmission paths as the primary path for the user equipment and determines at least one duplication path for different Quality of Service (QoS) degrees for the user equipment. The QoS degrees may be the 5QI values of the 5G QoS Indicator, but it is not limited thereto. Specifically, for each of the QoS degrees, the master communication apparatus selects a set of the transmission paths (e.g., all of or part of the transmission paths excluding the primary path) as at least one duplication path of the QoS degree according to a first parameter set and/or a second parameter set, wherein the first parameter set comprises the priority degrees and the second parameter set comprises a communication service status of each of the at least one data transmission apparatus. The communication service status of a data transmission apparatus reflects the communication and/or service status of that data transmission apparatus, which can be considered as being equivalent to the communication and/or service status of the duplication path corresponding to that data transmission apparatus. For example, the communication service status of a data transmission apparatus may include the load status, the wireless connection status, the wireless channel quality status, the buffer status of the data transmission apparatus, and/or the information of the corresponding transmission path (e.g. activation status or inactivation status), but it is not limited thereto. For example, for a higher QoS degree, the master communication apparatus may select a transmission path with a higher priority degree (e.g., with better communication quality) as the duplication path and/or select more transmission paths as the duplication paths.

The master communication apparatus will configure a Medium Access Control (MAC) logic channel parameter, e.g., a Logical Channel Prioritization restriction (LCP restriction), without being limited thereto. In addition, the master communication apparatus will configure at least one Packet Data Convergence Protocol (PDCP) parameter. It shall be noted that a PDCP parameter may be used to indicate the type of duplication data that a duplication path can transmit, wherein the type may be control signals and/or data. For example, a PDCP parameter may be used to indicate duplicating what is transmitted on a Signaling Radio Bearer (SRB) and/or duplicating what is transmitted on a Data Radio Bearer (DRB). The master communication apparatus then directly or indirectly transmits the MAC logic channel parameters and the at least one PDCP parameter to the user equipment. In some embodiments, the master communication apparatus also transmits the MAC logic channel parameter and the at least one PDCP parameter to the corresponding data transmission apparatus.

After the master communication apparatus has determined at least one corresponding duplication path for each QoS degree for the user equipment, the present invention may further determine which corresponding duplication path(s) will be activated for each QoS degree. Specifically, since each duplication path corresponds to a data transmission apparatus, the present invention may determine whether to activate a duplication path as an activated duplication path according to the priority degree and the communication service status of the data transmission apparatus corresponding to the duplication path. The data transmission apparatus corresponding to the activated duplication path includes an activated Radio Link Control entity (RLC entity). In some embodiments of the present invention, it is the master communication apparatus that determines whether to activate each duplication path. Yet, in some other embodiments of the present invention, it is the data transmission apparatus that determines whether to activate its corresponding duplication path.

Thereafter, if a packet of a data stream needs to be transmitted to the user equipment, the present invention will duplicate the packet into a plurality of copies, one of the copies will be transmitted by the primary path (if the instant service status of the primary path is acceptable), and the rest copies will be transmitted by some or all of the activated duplication paths. Specifically, the present invention ascertains the corresponding activated duplication path(s) according to the QoS degree corresponding to the data stream. For each activated duplication path corresponding to the QoS degree of the data stream, the present invention may further determine whether to actually adopt the activated duplication path to transmit the duplicated copy of the packet of the data stream according to the instant service status of the data transmission apparatus corresponding to the activated duplication path (e.g., the load status, the wireless connection status, the wireless channel quality status, the buffer status, without being limited thereto). The data transmission apparatus corresponding to the activated duplication path that is actually adopted comprises an activated RLC entity. It shall be noted that, in some embodiments of the present invention, it is the master communication apparatus that determines whether to adopt an activated duplication path to transmit a copy of the packet of the data stream. Yet, in some other embodiments of the present invention, it is the data transmission apparatus that determines whether to adopt an activated duplication path to transmit a copy of the packet of the data stream.

Please not that if other user equipments want to join in the mobile communication system as well, the present invention will perform the above-mentioned operations for each of these user equipments. The details will not be repeated herein. It shall be appreciated that the determinations made by the present invention for different user equipments may be the same or may be different.

The fifth generation of mobile communication technology provides a variety of system architectures. The operations of the base station and the master communication apparatus provided by the present invention under different system architectures will be explained below in various embodiments.

A first embodiment of the present invention is a mobile communication system 1 and a schematic view of a part of the mobile communication system 1 is depicted in FIG. 1A. The mobile communication system 1 conforms to the specification of the fifth generation of mobile communication technology and comprises a master cell group (MCG), a plurality of secondary cell groups (SCGs), and a core network 17. An Xn interface is individually established between the master cell group and each of the secondary cell groups, wherein each Xn interface is a logic interface defined in the specification of the fifth generation of mobile communication technology.

Figure 1B:
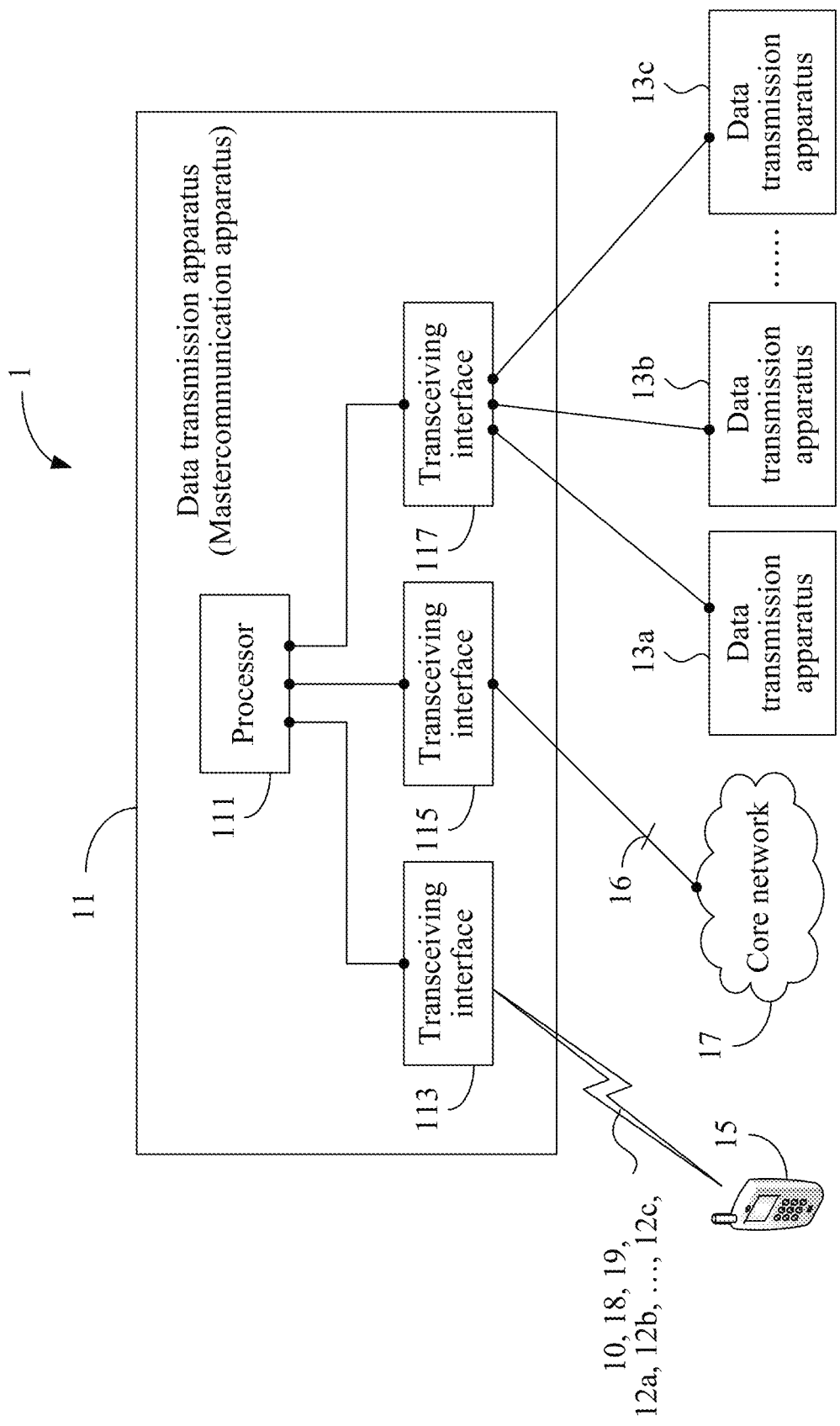
FIG. 1B depicts a schematic view of the data transmission apparatus of the mobile communication system 1.

FIG. 1B depicts a plurality of data transmission apparatuses 11, 13a, 13b, . . . , 13c comprised in the mobile communication system 1, wherein the data transmission apparatus 11 belongs to the master cell group and each of the data transmission apparatuses 13a, 13b, . . . , 13c belong to one of the secondary cell groups. In this embodiment, the data transmission apparatus 11 serves as a master communication apparatus. The data transmission apparatus 11 (i.e., the master communication apparatus) comprises a processor 111 and the transceiving interfaces 113, 115, and 117, wherein the processor 111 is electrically connected to the transceiving interfaces 113, 115, and 117. The transceiving interface 113 may be connected to a user equipment (e.g., a user equipment 15), the transceiving interface 115 is electrically connected to the core network 17, and the transceiving interface 117 is electrically connected to the data transmission apparatuses 13a, 13b, . . . , 13c.

The processor 111 may be one of various processing units, Central Processing Units (CPUs), Microprocessors, Digital Signal Processors (DSPs), or any other computing apparatuses with the same function and well-known to those of ordinary skill in the art. The transceiving interface 113 may be any wireless transceiving interface (e.g., an antenna) capable of communicating with a user equipment, the transceiving interface 115 may be any wired or wireless interface capable of communicating with the core network, and the transceiving interface 117 may be any wired or wireless interface capable of communicating with the data transmission apparatuses (i.e., the apparatuses within the secondary cell groups).

A logic interface is established between the data transmission apparatus 11 (i.e., the master communication apparatus) and the user equipment 15, which is called the Uu interface according to the fifth generation of mobile communication technology. A logic interface is established between the data transmission apparatus 11 (i.e., the master communication apparatus) and the core network 17, which is called the New Generation Application Protocol (NGAP) interface according to the fifth generation of mobile communication technology. Moreover, a logic interface is established between the data transmission apparatus 11 (i.e., the master communication apparatus) and each of the data transmission apparatuses, which is called the Xn interface according the fifth generation of mobile communication technology.

Figure 1C:
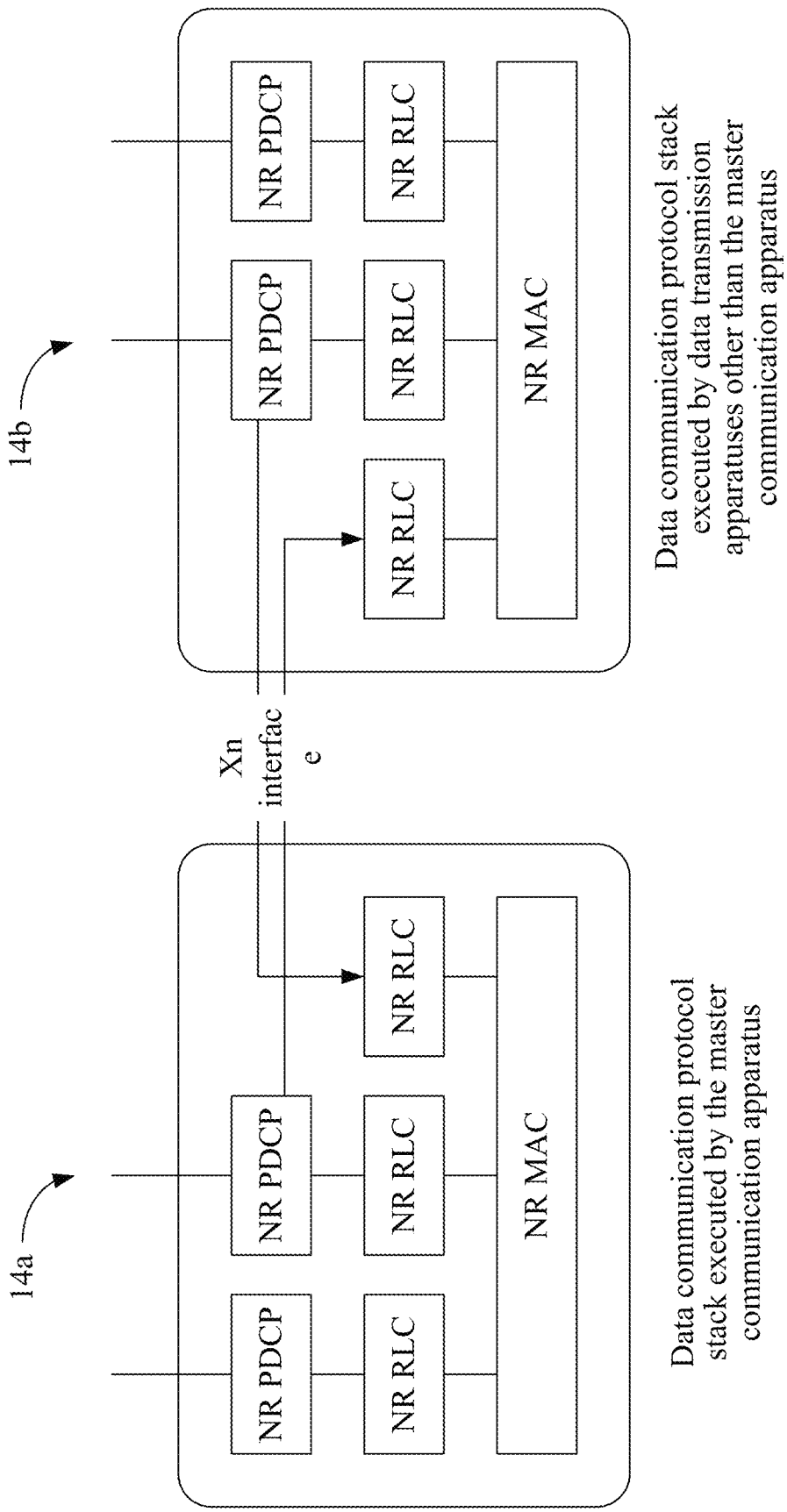
FIG. 1C depicts the data communication protocol stack executed by the mobile communication system 1.

Please refer to FIG. 1C, which depicts the data communication protocol stack 14a executed by the data transmission apparatus 11 (i.e., the master communication apparatus) and the data communication protocol stack 14b executed by each of the rest data transmission apparatuses 13a, 13b, . . . , 13c. Each of the data communication protocol stacks 14a and 14b comprises a New Radio (NR) PDCP layer, an NR RLC layer, and an NR MAC layer (from top to bottom). As shown in FIG. 1C, the Xn interface between the data transmission apparatus 11 (i.e., the master communication apparatus) and any of the data transmission apparatuses 13a, 13b, . . . , 13c is established between the NR PDCP layer of the data communication protocol stack 14a and the NR RLC layer of the data communication protocol stack 14b as well as between the NR PDCP layer of the data communication protocol stack 14b and the NR RLC layer of the data communication protocol stack 14a.

The user equipment 15 attaches to the data transmission apparatus 11 (i.e., the master communication apparatus) through the transceiving interface 113 and, thus, a transmission path (not shown) is established between the user equipment 15 and the data transmission apparatus 11. The processor 111 of the data transmission apparatus 11 (i.e., the master communication apparatus) then reconfigures the user equipment 15 and thereby a plurality of transmission paths (not shown) are established between the user equipment 15 and each of the data transmission apparatuses 13a, 13b, . . . , 13c.

The user equipment 15 measures a plurality of pieces of communication measurement information 10, 12a, 12b, . . . , 12c, which are respectively between the user equipment 15 and the data transmission apparatuses 11, 13a, 13b, . . . , 13c. The piece of communication measurement information between the user equipment 15 and a data transmission apparatus reflects the communication quality of the transmission path between the user equipment 15 and that data transmission apparatus. The pieces of communication measurement information 10, 12a, 12b, . . . , 12c may be any information that can be measured by the user equipment and can reflect the communication quality of the transmission path. For example, each of the pieces of communication measurement information 10, 12a, 12b, . . . , 12c may comprise an RSSI, an RSRP, and/or an RSRQ, but it is not limited thereto. The user equipment 15 transmits the pieces of communication measurement information 10, 12a, 12b, . . . , 12c to the data transmission apparatus 11 (i.e., the master communication apparatus), and the data transmission apparatus 11 (i.e., the master communication apparatus) receives the pieces of communication measurement information 10, 12a, 12b, . . . , 12c via the transceiving interface 113.

In this embodiment, the processor 111 of the data transmission apparatus 11 (i.e., the master communication apparatus) then determines the priority degree (not shown) of each transmission path according to the pieces of communication measurement information 10, 12a, 12b, . . . , 12c. In some other embodiments, the processor 111 may determine the priority degree of each transmission path according to the pieces of communication measurement information 10, 12a, 12b, . . . , 12c and/or the default priority levels of the 5G QoS Indicator.

The processor 111 of the data transmission apparatus 11 (i.e., the master communication apparatus) selects one of the transmission paths as a primary path (not shown) for the user equipment 15. In addition, for a plurality of QoS degrees (not shown) defined by the mobile communication system 1, the processor 111 of the data transmission apparatus 11 (i.e., the master communication apparatus) individually determines at least one corresponding duplication path to be used for different QoS degrees for the user equipment 15. The QoS degrees may be the 5QI values of the 5G QoS Indicator, but it is not limited thereto. Specifically, for each of the QoS degrees, the processor 111 of the data transmission apparatus 11 (i.e., the master communication apparatus) selects a first set of the transmission paths (from the transmission paths excluding the primary path, selecting some of them as the first set) as at least one duplication path of the QoS degree for the user equipment 15 according to a first parameter set and a second parameter set, wherein the first parameter set comprises the priority degrees and the second parameter set comprises the communication service status of each of the data transmission apparatuses 11, 13a, 13b, . . . , 13c. It shall be noted that different QoS degrees may correspond to different first sets (i.e., corresponding to different duplication path(s)).

Please note that the data transmission apparatuses 11, 13a, 13b, . . . , 13c may coordinate with each other and then derive the communication service statuses from each other via the Xn interface or derive the communication service statuses from the core network 17. For example, the data transmission apparatuses 11 (i.e. the master communication apparatus) may receive the communication service status of each of the data transmission apparatuses 11, 13a, 13b, . . . , 13c via the transceiving interface 117 or receives the communication service statuses from the core network 17 via the transceiving interface 115. The communication service status of a data transmission apparatus reflects the communication and/or service status of that data transmission apparatus, which can be considered as being equivalent to the communication and/or service status of the duplication path corresponding to that data transmission apparatus. For example, the communication service status of a data transmission apparatus may include the load status, the wireless connection status, the wireless channel quality status, the buffer status of the data transmission apparatus, and/or the information of the corresponding transmission path (e.g. activation status or inactivation status), but it is not limited thereto.

Please refer to a specific example shown in FIG. 1D for better understanding, which, however, is not intended to limit the scope of the present invention. In this specific example, the user equipment 15 has seven transmission paths L1 to L7 in the mobile communication system 1. The data transmission apparatus 11 (i.e., the master communication apparatus) selects the transmission path L1 as the primary path for the user equipment 15. For each of the QoS degrees Q1 to Q5, the data transmission apparatus 11 (i.e., the master communication apparatus) individually selects a first set of the transmission paths L1 to L7 as at least one duplication path of the QoS degree according to the priority degrees of the transmission paths L1 to L7 and/or the communication service statuses of the data transmission apparatuses 11, 13a, 13b, . . . , 13c. For example, for the QoS degree Q1, the first set selected by the data transmission apparatus 11 (i.e., the master communication apparatus) for the user equipment 15 includes the transmission paths L2, L3, and L4 and, hence, the transmission paths L2, L3, and L4 will serve as duplication paths for the QoS degree Q1. As another example, for the QoS degree Q5, the first set selected by the data transmission apparatus 11 (i.e., the master communication apparatus) for the user equipment 15 includes transmission paths L3, L4, L5, and L7 and, hence, the transmission paths L3, L4, L5, and L7 will serve as duplication paths for the QoS degree Q5.

Thereafter, the processor 111 of the data transmission apparatus 11 (i.e., the master communication apparatus) configures a MAC logic channel parameter 18 (e.g., a logical channel prioritization restriction, but it is not limited thereto). If the communication protocol stack executed by the processor 111 comprises a Radio Resource Control (RRC) layer, the processor 111 configures the MAC logic channel parameter 18 by the RRC layer. In addition, the processor 111 of the data transmission apparatus 11 (i.e., the master communication apparatus) configures a PDCP parameter 19. Likewise, if the communication protocol stack executed by the processor 111 comprises an RRC layer, the processor 111 configures the PDCP parameter 19 by the RRC layer. It shall be noted that the PDCP parameter is used to indicate the type of duplication data that a duplication path can transmit, wherein the type may be control signals and/or data. For example, a PDCP parameter may be used to indicate duplicating what is transmitted on an SRB and/or duplicating what is transmitted on a DRB. The transceiving interface 113 of the data transmission apparatus 11 (i.e., the master communication apparatus) transmits the MAC logic channel parameter 18 and the PDCP parameter 19 to the user equipment 15. In addition, the PDCP parameter 19 may comprise a primary path parameter, which is used to inform the user equipment 15 of which transmission path is the primary path. For example the primary path parameter may be the LogicalChannelIdentity parameter, the CellGroupId provided by the fifth generation of mobile communication technology, but it is not limited thereto.

Herein, it is assumed that after the data transmission apparatus 11 (i.e., the master communication apparatus) has determined at least one corresponding duplication path for each of the QoS degrees for the user equipment 15, the transceiving interface 115 receives a data stream 16 that is to be transmitted to the user equipment 15 from the core network 17. In some embodiments, each packet of the data stream 16 is duplicated into multiple copies, wherein one of the copies is transmitted by the primary path (if the instant service status of the primary path is acceptable) and the rest of the copies is/are transmitted by the duplication path(s) corresponding to the QoS degree of the data stream 16. In some other embodiments, if the instant service status of the primary path is poor, copies of packet of the data stream 16 will be transmitted only by the duplication path(s) corresponding to the QoS degree of the data stream 16. It shall be noted that, the number of copies of a packet is the same as the number of transmission paths that actually transmit the packet. In other words, if the primary path transmits a copy of the packet, the number of copies of a packet is the number of the primary path (i.e., 1) plus the number of duplication path(s) corresponding to the QoS degree of the data stream 16. If the primary path does not transmit the packet, the number of copies of a packet is the number of duplication path(s) corresponding to the QoS degree of the data stream 16.

In this embodiment, after the data transmission apparatus 11 (i.e., the master communication apparatus) has determined at least one corresponding duplication path for each of the QoS degrees for the user equipment 15, the data transmission apparatus 11 (i.e., the master communication apparatus) further determines which corresponding duplication path(s) will be activated for each of the QoS degrees. Specifically, the processor 111 of the data transmission apparatus 11 (i.e., the master communication apparatus) performs the following operation on the corresponding first set of each of the QoS degrees: selecting a second set of the at least one duplication path comprised in the first set as at least one activated duplication path according to the priority degree of each of the at least one duplication path comprised in the first set and the communication service status of each of the at least one data transmission apparatus that corresponds to the at least one duplication path comprised in the first set, wherein the second set may be the same as the first set or may be a subset of the first set. The transceiving interface 117 of the data transmission apparatus 11 (i.e., the master communication apparatus) further transmits an activation notification message (not shown) to each of the at least one data transmission apparatus that corresponds to the at least one activated duplication path. Each of the at least one data transmission apparatus that corresponds to the at least one activated duplication path includes an activated RLC entity.

The description will be continued with the specific example shown in FIG. 1D for better understanding, which, however, is not intended to limit the scope of the present invention. Taking the QoS degree Q1 as an example, the duplication paths included in the first set corresponding to the QoS degree Q1 are the transmission paths L2, L3, and L4. For the QoS degree Q1, the data transmission apparatus 11 (i.e., the master communication apparatus) selects a second set (e.g., the transmission paths L2 and L3) of the duplication paths (i.e., the transmission paths L2, L3, and L4) included in the first set as at least one activated duplication path according to the priority degree of each of the duplication paths included in the first set and the communication service status of each of the data transmission apparatuses that correspond to the duplication paths (i.e., the transmission paths L2, L3, and L4) included in the first set. Taking the QoS degree Q5 as another example, the duplication paths included in the first set corresponding to the QoS degree Q5 are the transmission paths L3, L4, L5 and L7. For the QoS degree Q5, the data transmission apparatus 11 (i.e., the master communication apparatus) selects a second set (e.g., the transmission paths L3, L4, L5, and L7) of the duplication paths (i.e., the transmission paths L3, L4, L5, and L7) included in the first set as at least one activated duplication path according to the priority degree of each of the duplication paths included in the first set and the communication service status of each the data transmission apparatuses that correspond to the duplication paths (i.e., the transmission paths L3, L4, L5, and L7) included in the first set.

Herein, it is assumed that after the data transmission apparatus 11 (i.e., the master communication apparatus) has determined at least one activated duplication path for each of the QoS degrees for the user equipment 15, the transceiving interface 115 receives a data stream 16 that is to be transmitted to the user equipment 15 from the core network 17. In some embodiments, each packet of the data stream 16 is duplicated into multiple copies, wherein one of the copies is transmitted by the primary path (if the instant service status of the primary path is acceptable) and the rest of the copies is/are transmitted by the activated duplication path(s) corresponding to the QoS degree of the data stream 16. In some other embodiments, if the instant service status of the primary path is poor, copies of each packet of the data stream 16 will be transmitted only by the activated duplication path(s) corresponding to the QoS degree of the data stream 16. It shall be noted that the number of copies of a packet is the same as the number of transmission paths that actually transmit the packet. In other words, if the primary path transmits the packet, the number of copies of a packet is the number of the primary path (i.e., 1) plus the number of the activated duplication path(s) corresponding to the QoS degree of the data stream 16. If the primary path does not transmit the packet, the number of copies of a packet is the number of the activated duplication path(s) corresponding to the QoS degree of the data stream 16.

In this embodiment, after the data transmission apparatus 11 (i.e., the master communication apparatus) has determined at least one corresponding activated duplication path for each of the QoS degrees for the user equipment 15, the data transmission apparatus 11 (i.e., the master communication apparatus) further determines which activated duplication path(s) will be adopted for transmission when there is a packet to be transmitted.

Herein, it is assumed that the transceiving interface 115 receives a data stream 16 that is to be transmitted to the user equipment 15 from the core network 17. The data stream 16 corresponds to one of the QoS degrees defined by the mobile communication system 1. The processor 111 of the data transmission apparatus 11 (i.e., the master communication apparatus) ascertains the second set corresponding to the data stream 16 (i.e., ascertains the corresponding activated duplication path(s)) according to the QoS degree corresponding to the data stream 16. The transceiving interface 117 of the data transmission apparatus 11 (i.e., the master communication apparatus) receives an instant service status of each of at least one data transmission apparatus that corresponds to the at least one activated duplication path included in the second set. The processor 111 of the data transmission apparatus 11 (i.e., the master communication apparatus) further designates a third set of the at least one activated duplication path comprised in the second set as at least one adopted duplication path according to the instant service status (e.g., the load status, the wireless connection status, the wireless channel quality status, the buffer status, without being limited thereto) of each of the at least one data transmission apparatus that corresponds to the at least one activated duplication path comprised in the second set, wherein the third set may be the same as the second set or may be a subset of the second set. Each of the at least one data transmission apparatus that corresponds to the at least one adopted duplication path comprises an activated RLC entity.

Thereafter, each packet to be transmitted to the user equipment 15 in the data stream 16 is duplicated into a plurality of copies, wherein one of the copies is transmitted by the primary path (if the instant service status of the primary path is acceptable) and the rest of the copies are transmitted to the user equipment 15 by the adopted duplication path(s) corresponding to the QoS degree of the data stream 16. In some embodiments, if the instant service status of the primary path is poor, the copies of each packet of the data stream 16 may be transmitted only through the adopted duplication path(s) corresponding to the QoS degree of the data stream 16. It shall be noted that the number of copies of a packet is the same as the number of transmission paths that actually transmit the packet. In other words, if the primary path transmits the packet, the number of copies of a packet is the number of the primary path (i.e., 1) plus the number of the adopted duplication paths corresponding to the QoS degree of the data stream 16. If the primary path does not transmit the packet, the number of copies of a packet is the number of the adopted duplication paths corresponding to the QoS degree of the data stream 16.

The description will be continued with the specific example shown in FIG. 1D for better understanding, which, however, is not intended to limit the scope of the present invention. Herein, it is assumed that the data stream 16 corresponds to the QoS degree Q5. The data transmission apparatus 11 (i.e., the master communication apparatus) ascertains that the data stream 16 corresponds to the second set (i.e., including the transmission paths L3, L4, L5, and L7) corresponding to the QoS degree Q5 according to the QoS degree Q5 corresponding to the data stream 16. The transceiving interface 115 of the data transmission apparatus 11 (i.e., the master communication apparatus) receives an instant service status of each of the the data transmission apparatuses that correspond to the activated duplication paths (i.e., the transmission paths L3, L4, L5, L7) included in the second set. The processor 111 of the data transmission apparatus 11 (i.e., the master communication apparatus) further designates a third set (e.g., the transmission paths L4, L5, and L7) of the activated duplication paths (i.e., the transmission paths L3, L4, L5, and L7) comprised in the second set as the adopted duplication paths according to the instant service status of each of the data transmission apparatuses that correspond to the activated duplication paths (i.e., the transmission paths L3, L4, L5, and L7) comprised in the second set. Thereafter, each packet to be transmitted to the user equipment 15 in the data stream 16 is duplicated into a plurality of copies and then transmitted to the user equipment 15 through the primary path (i.e., the transmission path L1) and the adopted duplication paths (i.e., the transmission paths L4, L5 and L7).

Figure 2A:
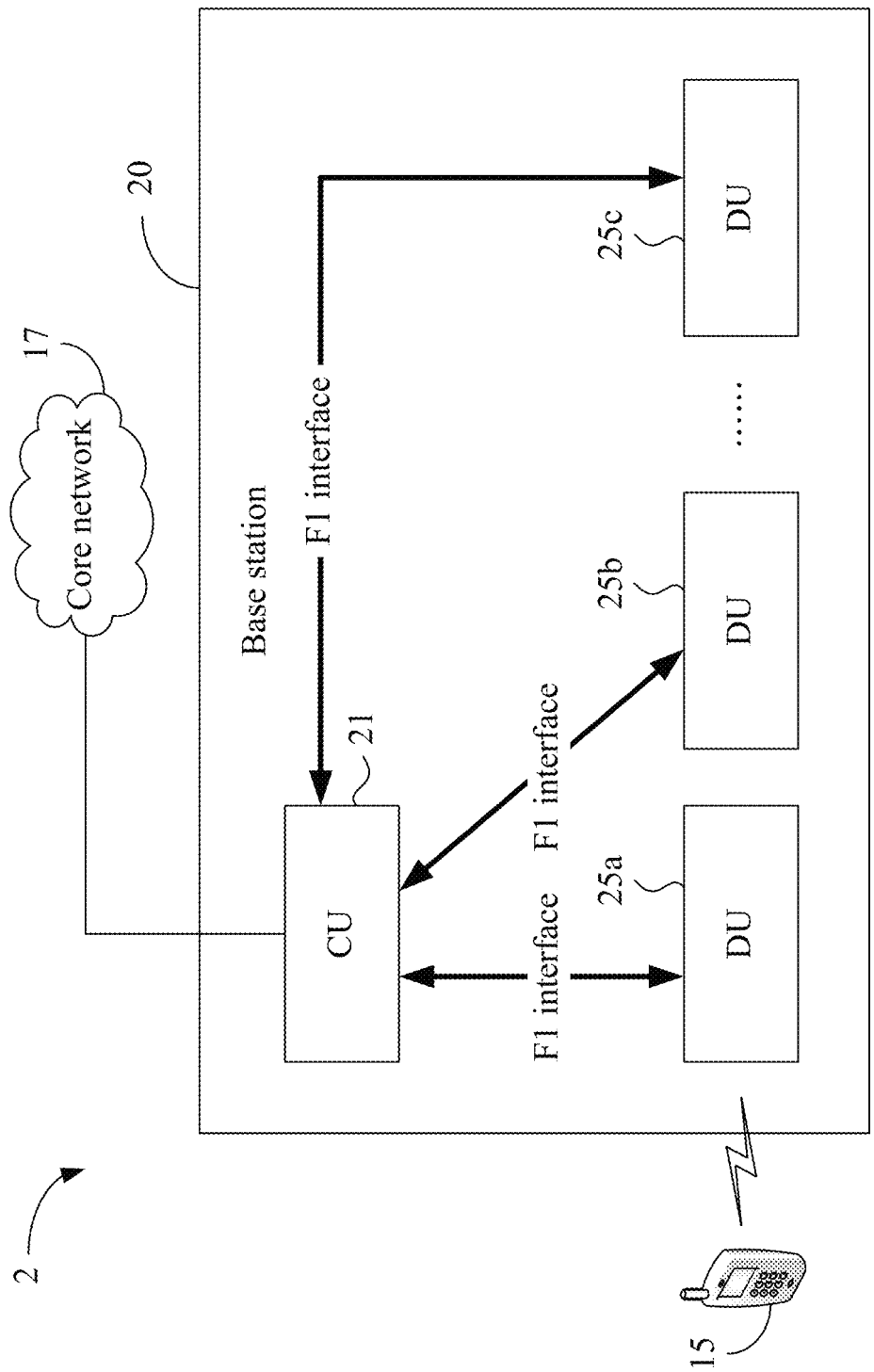
FIG. 2A depicts a schematic view of a part of a mobile communication system 2.

A second embodiment of the present invention is a mobile communication system 2 and a schematic view of a part of the mobile communication system 2 is depicted in FIG. 2A. The mobile communication system 2 conforms to the specification of the fifth generation of mobile communication technology and comprises a base station (the base station may be referred to as a gNodeB or gNB according to the specification of the fifth generation of mobile communication technology) 20 and a core network 17. The base station 20 comprises a centralized unit (CU) 21 and a plurality of distributed units (DUs) 25a, 25b, . . . 25c. An F1 interface is individually established between the CU 21 and each of the DUs 25a, 25b, . . . , 25c, wherein each F1 interface is a logic interface defined in the specification of the fifth generation of mobile communication technology. In this embodiment, the CU 21 serves as a master communication apparatus, and each of the DUs 25a, 25b, . . . , 25c serves as a data transmission apparatus.

Figure 2B:
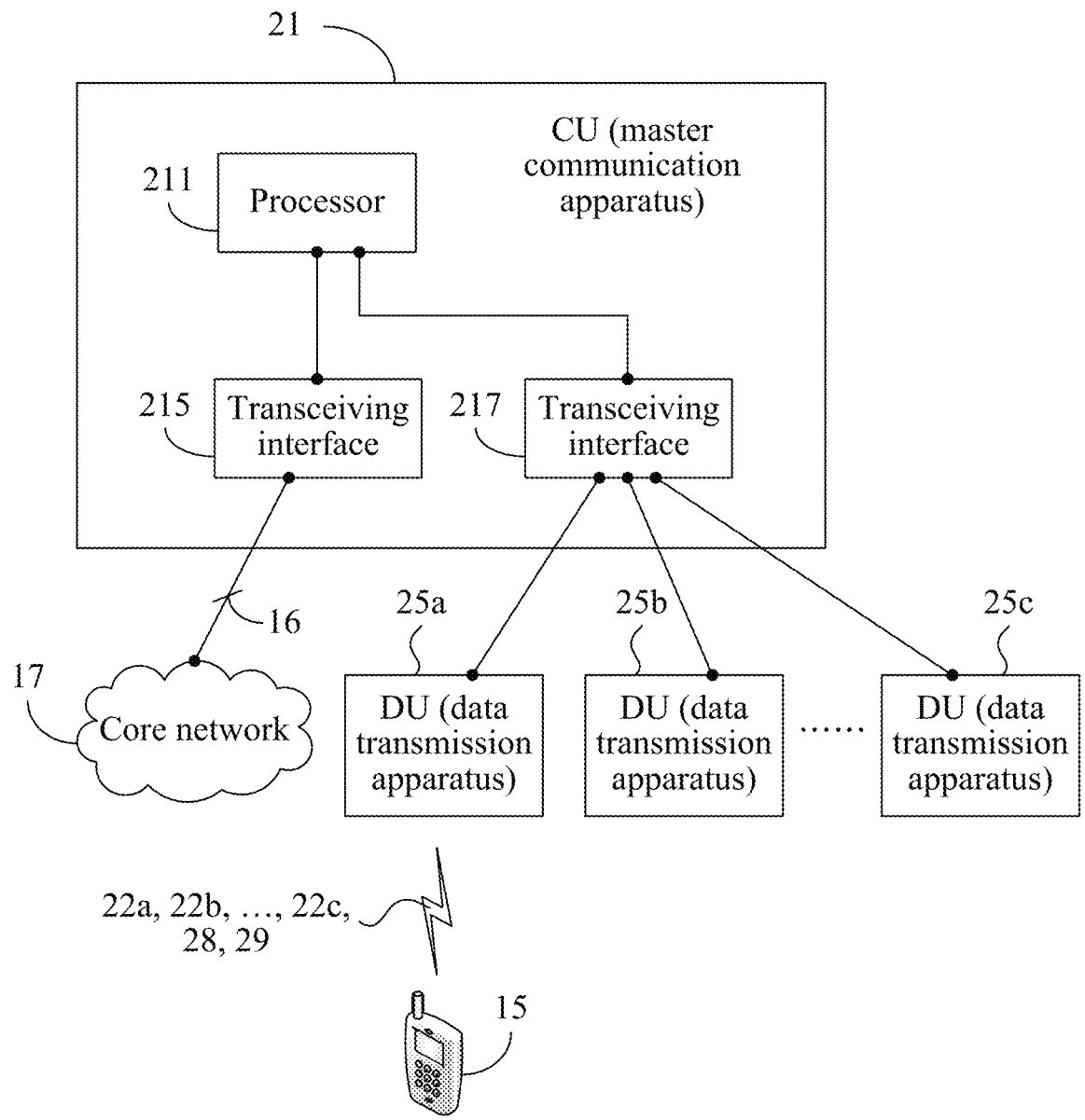
FIG. 2B depicts a schematic view depicting a centralized unit (CU) 21.

Please refer to FIG. 2B, which is a schematic view depicting the CU 21. The CU 21 (i.e., the master communication apparatus) comprises a processor 211 and the transceiving interfaces 215 and 217, wherein the processor 211 is electrically connected to the transceiving interfaces 215 and 217, the transceiving interface 215 is electrically connected to the core network 17, and the transceiving interface 217 is electrically connected to all the DUs 25a, 25b, . . . , 25c. The processor 211 may be one of various processing units, CPUs, microprocessors, DSPs, or any other computing apparatuses with the same function and well-known to those of ordinary skill in the art. The transceiving interface 215 may be any wired or wireless interface capable of communicating with the core network, and the transceiving interface 217 may be any wired or wireless interface capable of communicating with the distribution units.

Figure 2C:
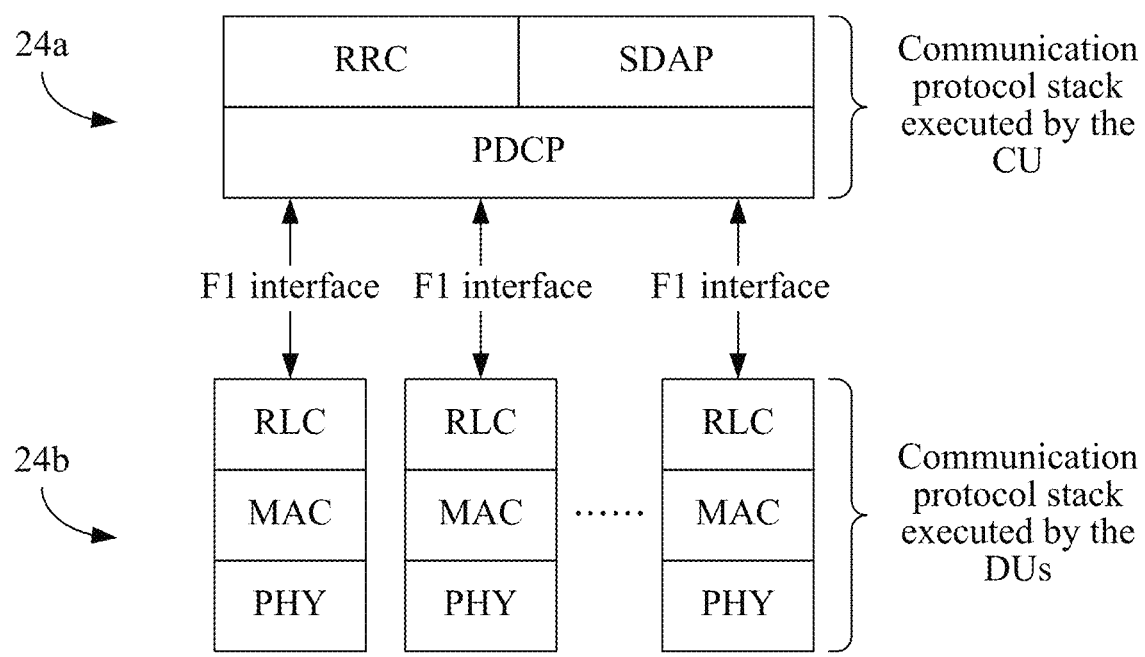
FIG. 2C depicts the data communication protocol stack executed by the mobile communication system 2.

Please refer to FIG. 2C, which depicts the communication protocol stack 24a executed by the CU 21 and the communication protocol stack 24b executed by each of the DUs 25a, 25b, . . . , 25c. The communication protocol stack 24a comprises an RRC layer, a Service Data Adaptation Protocol (SDAP) layer, and a PDCP layer, while the communication protocol stack 24b comprises an RLC layer, a MAC layer, and a Physical (PHY) layer (from top to bottom). The F1 interface between the CU 21 and each of the DUs 25a, 25b, . . . , 25c is established between the PDCP layer of the communication protocol stack 24a and the RLC layer of the communication protocol stack 24b.

In this embodiment, the user equipment 15 is attached to the CU 21 through the DU 25a (i.e., the data transmission apparatus). Thus, a transmission path (not shown) is established between the user equipment 15 and the DU 25a. The processor 211 of the CU 21 (i.e., the master communication apparatus) then reconfigures the user equipment 15 so that a transmission path is also individually established between the user equipment 15 and each of the DUs 25b, . . . , 25c.

The user equipment 15 measures a plurality of pieces of communication measurement information 22a, 22b, . . . , 22c respectively between the user equipment 15 and the DUs 25a, 25b, . . . , 25c. The piece of communication measurement information between the user equipment 15 and a DU reflects the communication quality of the transmission path between the user equipment 15 and that DU. The pieces of communication measurement information 22a, 22b, . . . , 22c may be any information that can be measured by the user equipment and can reflect the communication quality of the transmission path. For example, each of the pieces of communication measurement information 22a, 22b, . . . , 22c may comprise an RSSI, an RSRP, and/or an RSRQ, but it is not limited thereto. In this embodiment, the user equipment 15 transmits the pieces of communication measurement information 22a, 22b, . . . , 22c to the CU 21 (i.e., the master communication apparatus) through the DU 25a, and the CU 21 (i.e., the master communication apparatus) receives the pieces of communication measurement information 22a, 22b, . . . , 22c indirectly (i.e., via the DU 25a) through the transceiving interface 217.

In this embodiment, the processor 211 determines the priority degree (not shown) of each transmission path according to the pieces of communication measurement information 22a, 22b, . . . , 22c. In some other embodiments, the processor 111 may determine the priority degree of each transmission path according to the pieces of communication measurement information 22a, 22b, . . . , 22c and/or the default priority levels of the 5G QoS Indicator.

The processor 211 of the CU 21 (i.e., the master communication apparatus) selects one of the transmission paths as a primary path (not shown) of the user equipment 15. For a plurality of QoS degrees (not shown) defined by the mobile communication system 2, the processor 211 of the CU 21 (i.e., the master communication apparatus) individually determines at least one corresponding duplication path to be used for different QoS degrees for the user equipment 15. The QoS degrees may be the 5QI values of the 5G QoS Indicator, but it is not limited thereto. Specifically, for each of the QoS degrees, the processor 211 of the CU 21 (i.e., the master communication apparatus) selects a first set of the transmission paths (from the transmission paths excluding the primary path, selecting some of them as the first set) as at least one duplication path of the QoS degree for the user equipment 15 according to a first parameter set and/or a second parameter set, wherein the first parameter set comprises the priority degrees and the second parameter set comprises the communication service status of each of the DUs 25a, 25b, . . . , 25c (i.e. the data transmission apparatuses). It shall be noted that different QoS degrees may correspond to different first set (i.e., corresponding to different duplication path(s)). The specific example shown in FIG. 1D may be referred to for better understanding.

Please note that the DUs 25a, 25b, . . . , 25c (i.e. the data transmission apparatuses) may coordinate with each other via the CU 21 and then derive the communication service statuses from the CU 21. The CU 21 (i.e. the master communication apparatus) receives the communication service status of each of the DUs 25a, 25b, . . . , 25c (i.e. the data transmission apparatuses) via the transceiving interface 217 or receives the communication service statuses from the core network 17 via the transceiving interface 215. The communication service status of a DU reflects the communication and/or service status of that DU, which can be considered as being equivalent to the communication and/or service status of the duplication path corresponding to that DU. For example, the communication service status of a DU may include the load status, the wireless connection status, the wireless channel quality status, the buffer status of the data transmission apparatus, and/or the information of the corresponding transmission path (e.g. activation status or inactivation status), but it is not limited thereto.

Thereafter, the processor 211 of the CU 21 (i.e., the master communication apparatus) configures a MAC logic channel parameter 28 (e.g., a logical channel prioritization restriction, but it is not limited thereto). It is noted that the processor 111 configures the MAC logic channel parameter 28 by the RRC layer. In addition, the processor 211 of the CU 21 (i.e., the master communication apparatus) configures a PDCP parameter 29. Likewise, the processor 111 configures the PDCP parameter 29 by the RRC layer. In this embodiment, the purpose of configuring the PDCP parameter 29 and the content of the PDCP parameter 29 are the same as those described in the first embodiment and, thus, will not be repeated herein. The transceiving interface 217 of the CU 21 (i.e., the master communication apparatus) transmits the MAC logic channel parameter 28 and the PDCP parameter 29 to the user equipment 15 indirectly (i.e., through the DU 25a).

Herein, it is assumed that after the CU 21 (i.e., the master communication apparatus) has determined at least one corresponding duplication path for each of the QoS degrees for the user equipment 15, the transceiving interface 215 receives a data stream 16 that is to be transmitted to the user equipment 15 from the core network 17. In some embodiments, each packet of the data stream 16 is duplicated into multiple copies, one of the copies is transmitted by the primary path (if the instant service status of the primary path is acceptable) and the rest of the copies is/are transmitted by the duplication path(s) corresponding to the QoS degree of the data stream 16. In some embodiments, if the instant service status of the primary path is poor, copies of each packet of the data stream 16 will be transmitted only by the duplication path(s) corresponding to the QoS degree of the data stream 16. It shall be noted that the number of copies of a packet is the same as the number of transmission paths that actually transmit the packet. In other words, if the primary path transmits the packet, the number of copies of a packet is the number of the primary path (i.e., 1) plus the number of duplication paths corresponding to the QoS degree of the data stream 16. If the primary path does not transmit the packet, the number of copies of a packet is the number of duplication paths corresponding to the QoS degree of the data stream 16.

In this embodiment, after the CU 21 (i.e., the master communication apparatus) has determined at least one corresponding duplication path for each of the QoS degrees for the user equipment 15, the CU 21 (i.e., the master communication apparatus) further determines which corresponding duplication path(s) will be activated for each of the QoS degrees. Specifically, the processor 211 of the CU 21 (i.e., the master communication apparatus) further performs the following operation on the corresponding first set of each of the QoS degrees: selecting a second set of the at least one duplication path comprised in the first set as at least one activated duplication path according to the priority degree of each of the at least one duplication path comprised in the first set and the communication service status of each of the at least one data transmission apparatus that corresponds to the at least one duplication path comprised in the first set, wherein the second set may be the same as the first set or may be a subset of the first set. The transceiving interface 117 of the CU 21 (i.e., the master communication apparatus) further transmits an activation notification message (not shown) to each of the at least one data transmission apparatus that corresponds to the at least one activated duplication path. Each of the at least one data transmission apparatus that corresponds to the at least one activated duplication paths includes an activated RLC entity. For ease of understanding, please refer to the specific example shown in FIG. 1D.

In some embodiments, regarding the first set of each QoS degree, whether a duplication path comprised therein is activated is determined by the data transmission apparatus corresponding to that duplication path according to the communication service status thereof. Similarly, in these embodiments, a second set of the duplication paths included in the first set corresponding to each QoS degree includes the activated duplication path(s), wherein the second set may be the same as the first set or may be a subset of the first set. The data transmission apparatus corresponding to an activated duplication path include an activated RLC entity.

Herein, it is assumed that after the CU 21 (i.e., the master communication apparatus) has determined at least one activated duplication path for each of the QoS degrees for the user equipment 15, the transceiving interface 215 receives a data stream 16 that is to be transmitted to the user equipment 15 from the core network 17. In some embodiments, each packet of the data stream 16 is duplicated into multiple copies, wherein one of the copies is transmitted by the primary path (if the instant service status of the primary path is acceptable) and the rest of the copies is/are transmitted by the activated duplication path(s) corresponding to the QoS degree of the data stream 16. In some embodiments, if the instant service status of the primary path is poor, the copies of each packet of the data stream 16 will be transmitted only by the activated duplication path(s) corresponding to the QoS degree of the data stream 16. It shall be noted that the number of copies of a packet is the same as the number of transmission paths that actually transmit the packet. In other words, if the primary path transmits the packet, the number of copies of a packet is the number of the primary path (i.e., 1) plus the number of the activated duplication path(s) corresponding to the QoS degree of the data stream 16. If the primary path does not transmit the packet, the number of copies of a packet is the number of the activated duplication path(s) corresponding to the QoS degree of the data stream 16.

In this embodiment, after the CU 21 (i.e., the master communication apparatus) has determined at least one corresponding activated duplication path for each of the QoS degrees for the user equipment 15, the CU 21 (i.e., the master communication apparatus) further determines which corresponding activated duplication path(s) will be adopted for transmission when there is a packet to be transmitted.

Herein, it is assumed that the transceiving interface 215 receives a data stream 16 that is to be transmitted to the user equipment 15 from the core network 17. The data stream 16 corresponds to one of the QoS degrees defined by the mobile communication system 2. The processor 211 of the CU 21 (i.e., the master communication apparatus) ascertains the second set corresponding to the data stream 16 (i.e., ascertains the corresponding activated duplication path(s)) according to the QoS degree corresponding to the data stream 16. The transceiving interface 217 of the CU 21 (i.e., the master communication apparatus) receives an instant service status (e.g., the load status, the wireless connection status, the wireless channel quality status, the buffer status, without being limited thereto) of each of the at least one data transmission apparatus that corresponds to the at least one activated duplication path included in the second set. The processor 211 of the CU 21 (i.e., the master communication apparatus) further designates a third set of the at least one activated duplication path comprised in the second set as at least one adopted duplication path according to the instant service status of each of the at least one data transmission apparatus that corresponds to the at least one activated duplication path comprised in the second set, wherein the third set may be the same as the second set or may be a subset of the second set. The data transmission apparatus corresponding to any of the aforesaid adopted duplication path comprises an activated RLC entity.

Thereafter, each packet to be transmitted to the user equipment 15 in the data stream 16 is duplicated into a plurality of copies, wherein one of the copies is transmitted by the primary path (if the instant service status of the primary path is acceptable) and the rest of the copies is/are transmitted to the user equipment 15 by the adopted duplication path(s) corresponding to the QoS degree of the data stream 16. In some embodiments, if the instant service status of the primary path is poor, the copies of each packet of the data stream 16 will be transmitted only by the adopted duplication path. It shall be noted that the number of copies of a packet is the same as the number of transmission paths that actually transmit the packet. In other words, if the primary path transmits the packet, the number of copies of a packet is the number of the primary path (i.e., 1) plus the number of the adopted duplication paths corresponding to the QoS degree of the data stream 16. If the primary path does not transmit the packet, the number of copies of a packet is the number of the adopted duplication paths corresponding to the QoS degree of the data stream 16.

In some embodiments, each of the packets to be transmitted to the user equipment 15 in the data stream 16 is duplicated into multiple copies, and these copies are transmitted to the data transmission apparatus(es) corresponding to the activated duplication path(s) included in the second set corresponding to the data stream 16. Each data transmission apparatus that receives the copy of the packet then determines whether to transmit the copy of the packet to the user equipment 15 according to the instant service status thereof (e.g., the load status, the wireless connection status, the wireless channel quality status, the buffer status, without being limited thereto). In other words, a set of the data transmission apparatuses that receive the copy of the packet will transmit the copy to the user equipment 15. Any data transmission apparatus that transmit the copy of the packet to the user equipment 15 include an activated RLC entity.

Figure 3A:
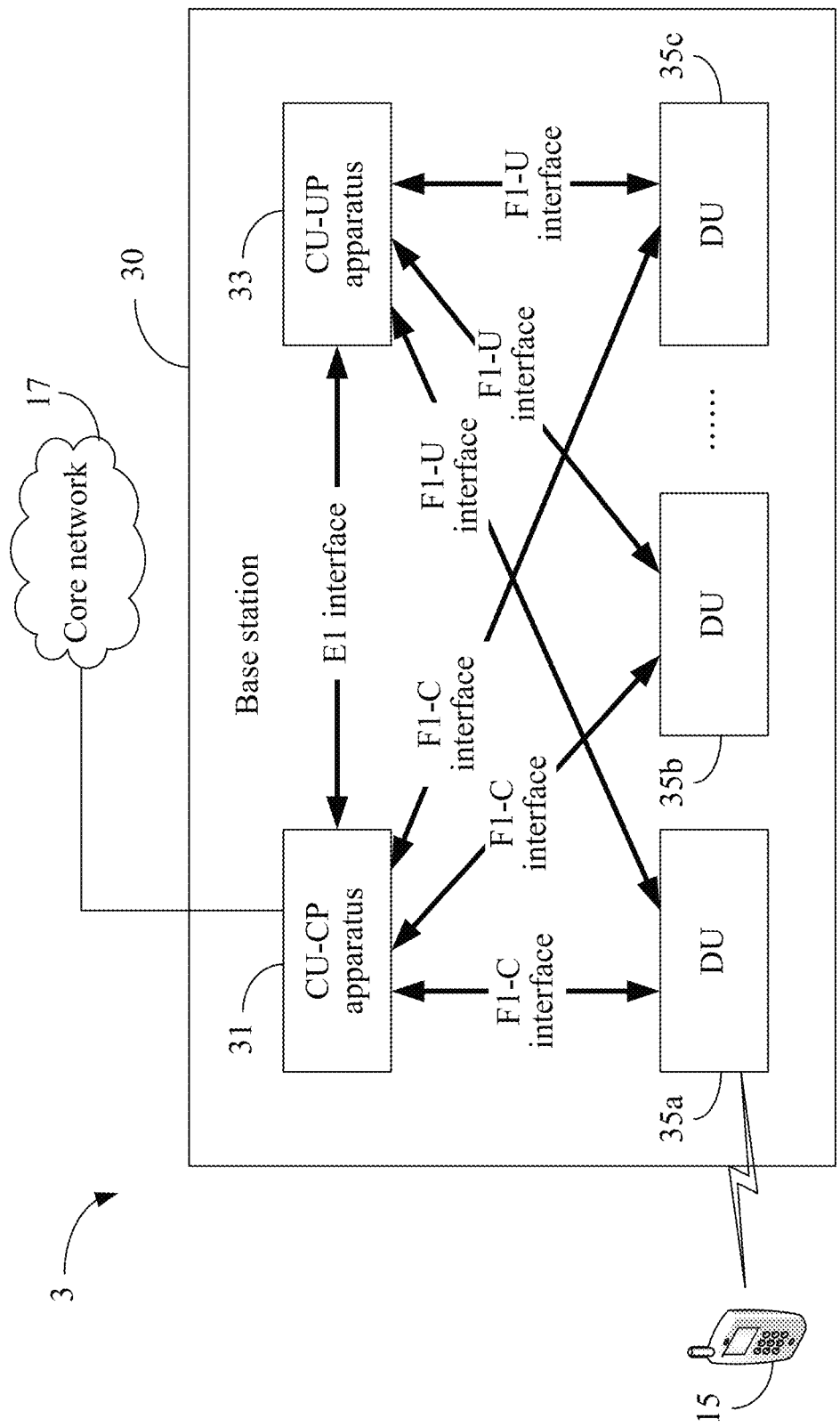
FIG. 3A depicts a schematic view of a part of the mobile communication system 3.

A third embodiment of the present invention is a mobile communication system 3 and a schematic view of a part of the mobile communication system 3 is depicted in FIG. 3A. The mobile communication system 3 conforms to the specification of the fifth generation of mobile communication technology and comprises a base station 30 and a core network 17. The base station 30 comprises a CU-Control Plane (CP) apparatus 31, a CU-User Plane (UP) apparatus 33, and a plurality of DUs 35a, 35b, . . . , 35c. An E1 interface is established between the CU-CP apparatus 31 and the CU-UP apparatus 33, an F1-C interface is individually established between the CU-CP apparatus 31 and each of the DUs 35a, 35b, . . . 35c, and an F1-U interface is individually established between the CU-UP apparatus 33 and each of the DUs 35a, 35b, . . . , 35c. In this embodiment, the CU-CP apparatus 31 serves as a master communication apparatus, and each of the DUs 35a, 35b, . . . , 35c serves as a data transmission apparatus.

Figure 3B:
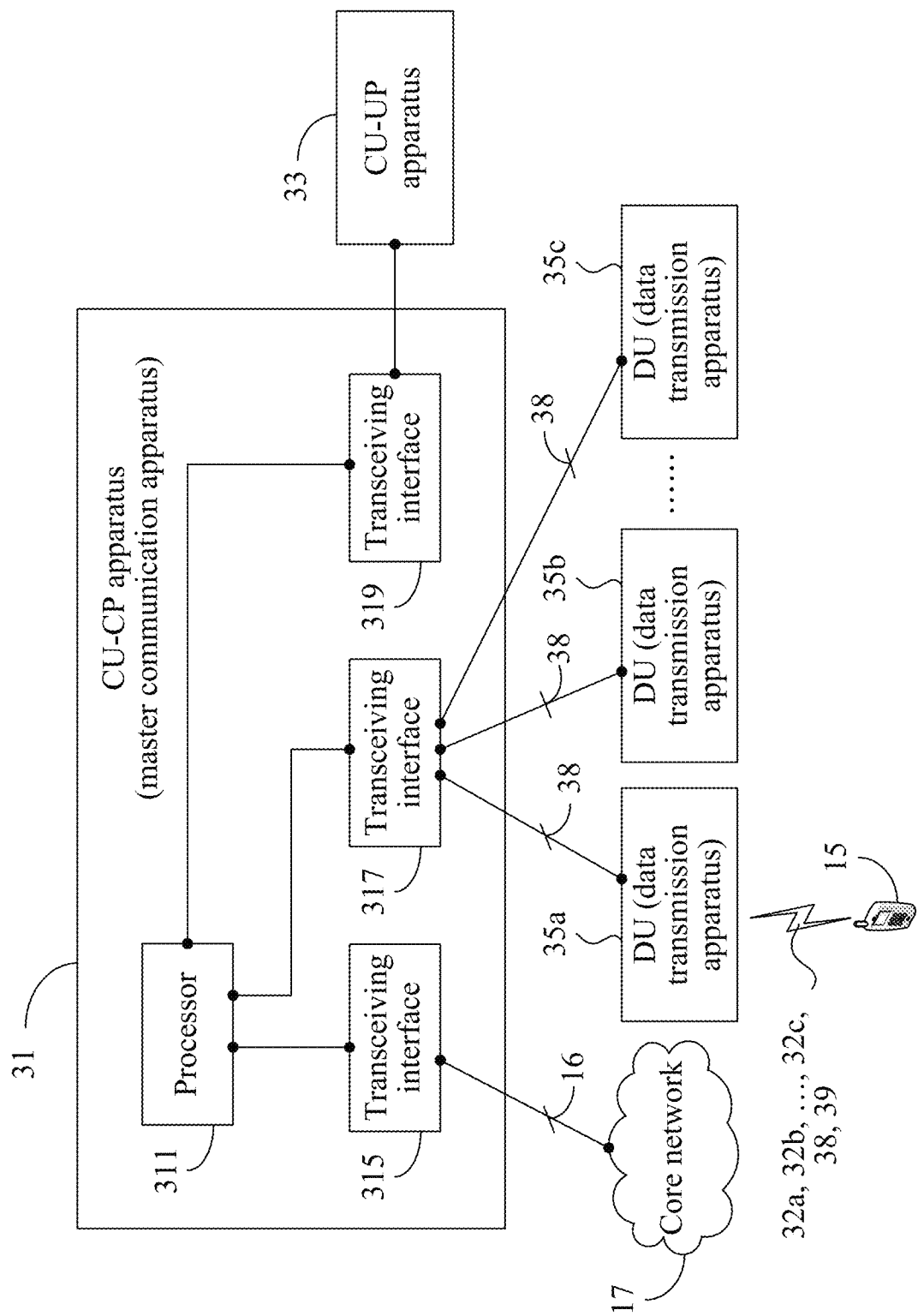
FIG. 3B depicts a schematic view of the CU-control plane (CP) apparatus 31.

Please refer to FIG. 3B, which is a schematic view depicting the CU-CP apparatus 31. The CU-CP apparatus 31 (i.e., the master communication apparatus) comprises a processor 311 and the transceiving interfaces 315, 317, and 319, wherein the processor 311 is electrically connected to the transceiving interfaces 315, 317, and 319. The transceiving interface 315 is electrically connected to the core network 17, the transceiving interface 317 is electrically connected to all the DUs 35a, 35b, . . . , 35c, and the transceiving interface 319 is electrically connected to the CU-UP apparatus 33. The processor 311 may be one of various processing units, CPUs, microprocessors, DSPs, or any other computing apparatuses with the same function and well-known to those of ordinary skill in the art. The transceiving interface 315 may be any wired or wireless interface capable of communicating with the core network, the transceiving interface 317 may be any wired or wireless interface capable of communicating with the DUs, and the transceiving interface 319 may be any wired or wireless interface capable of communicating with the CU-UP apparatus.

Figure 3C:
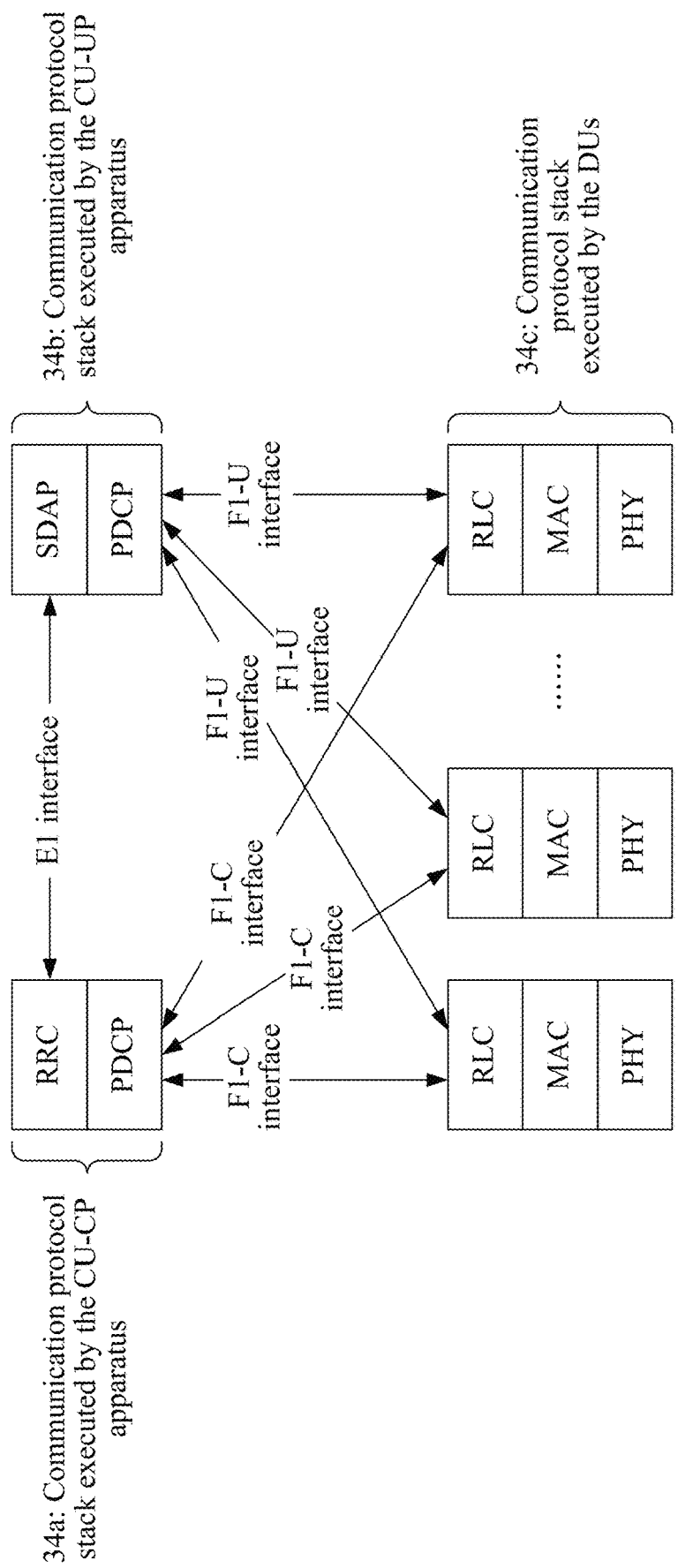
FIG. 3C depicts the data communication protocol stack executed by the mobile communication system 3.

Please refer to FIG. 3C, which depicts the communication protocol stack 34a executed by the CU-CP apparatus 31, the communication protocol stack 34b executed by the CU-UP apparatus 33, and the communication protocol stack 34c individually executed by the DUs 35a, 35b, . . . , 35c. The communication protocol stack 34a comprises an RRC layer and a PDCP layer (from top to bottom), the communication protocol stack 34b comprises an SDAP layer and a PDCP layer (from top to bottom), and the communication protocol stack 34c comprises an RLC layer, a MAC layer, and a PHY layer (from top to bottom). The E1 interface between the CU-CP apparatus 31 (i.e., the master communication apparatus) and the CU-UP apparatus 33 is established between the RRC layer of the communication protocol stack 34a and the SDAP layer of the communication protocol stack 34b. The F1-C interface between the CU-CP apparatus 31 (i.e., the master communication apparatus) and any of the DUs 35a, 35b, . . . , 35c is established between the PDCP layer of the communication protocol stack 34a and the RLC layer of the communication protocol stack 34c. The F1-U interface between the CU-UP apparatus 33 and any of the DUs 35a, 35b, . . . , 35c is established between the PDCP layer of the communication protocol stack 34b and the RLC layer of the communication protocol stack 34c.

In this embodiment, the user equipment 15 is attached to the CU-CP apparatus 31 (i.e., the master communication apparatus) through the DU 35a. Thus, a transmission path (not shown) is established between the user equipment 15 and the DU 35a. The processor 311 of the CU-CP apparatus 31 (i.e., the master communication apparatus) then reconfigures the user equipment 15 so that a transmission path is also individually established between the user equipment 15 and each of the other DUs 35b, . . . , 35c.

The user equipment 15 measures a plurality of pieces of communication measurement information 32a, 32b, . . . , 32c respectively between the user equipment 15 and the DUs 35a, 35b, . . . , 35c. The meaning and the content of each piece of communication measurement information are the same as those described in the aforesaid embodiments, and therefore will not be further described herein. In this embodiment, the user equipment 15 transmits the pieces of communication measurement information 32a, 32b, . . . , 32c to the CU-CP apparatus 31 (i.e., the master communication apparatus) through the DU 35a, and the CU-CP apparatus 31 (i.e., the master communication apparatus) receives the pieces of communication measurement information 32a, 32b, . . . , 32c indirectly (i.e., via the DU 35a) through the transceiving interface 317. In this embodiment, the processor 311 determines the priority degree (not shown) of each transmission path according to the pieces of communication measurement information 32a, 32b, . . . , 32c. In some other embodiments, the processor 311 may determine the priority degree of each transmission path according to the pieces of communication measurement information 32a, 32b, . . . , 32c and/or the default priority levels of the 5G QoS Indicator.

The processor 311 of the CU-CP apparatus 31 (i.e., the master communication apparatus) selects one of the transmission paths as a primary path (not shown) of the user equipment 15. For a plurality of QoS degrees (not shown) defined by the mobile communication system 3, the processor 311 of the CU-CP apparatus 31 (i.e., the master communication apparatus) individually determines at least one corresponding duplication path to be used for different QoS degrees for the user equipment 15. The QoS degrees may be the 5QI values of the 5G QoS Indicator, but it is not limited thereto. Specifically, for each of the QoS degrees, the processor 311 of the CU-CP apparatus 31 (i.e., the master communication apparatus) selects a first set of the transmission paths (from the transmission paths excluding the primary path, selecting some of them as the first set) as at least one duplication path of the QoS degree for the user equipment 15 according to a first parameter set and a second parameter set, wherein the first parameter set comprises the priority degrees and the second parameter set comprises the communication service status of each of the DUs 35a, 35b, . . . , 35c (i.e. the data transmission apparatuses). It shall be noted that different QoS degrees may correspond to different first set (i.e., corresponding to different duplication path(s)). For better understanding, please refer to the specific example shown in FIG. 1D.

Please note that the DUs 35a, 35b, . . . , 35c (i.e. the data transmission apparatuses) may coordinate with each other via the CU-CP apparatus 31 and then derive the communication service statuses from the CU-CP apparatus 31. The CU-CP apparatus 31 (i.e. the master communication apparatus) receives the communication service status of each of the DUs 35a, 35b, . . . , 35c (i.e. the data transmission apparatuses) via the transceiving interface 317 or receives the communication service statuses from the core network 17 via the transceiving interface 315. The communication service status of a DU reflects the communication and/or service status of that DU, which can be considered as being equivalent to the communication and/or service status of the duplication path corresponding to that DU. For example, the communication service status of a DU may include the load status, the wireless connection status, the wireless channel quality status, the buffer status of the data transmission apparatus, and/or the information of the corresponding transmission path (e.g. activation status or inactivation status), but it is not limited thereto.

Thereafter, the processor 311 of the CU-CP apparatus 31 (i.e., the master communication apparatus) configures a MAC logic channel parameter 38 (e.g., a logical channel prioritization restriction, but it is not limited thereto). It is noted that the processor 311 configures the MAC logic channel parameter 38 by the RRC layer. In addition, the processor 311 of the CU-CP apparatus 31 (i.e., the master communication apparatus) configures a PDCP parameter 39. Similarly, the processor 311 configures the PDCP parameter 39 by the RRC layer. In this embodiment, the purpose of configuring the PDCP parameter 39 and the content of the PDCP parameter 39 are the same as those described in the aforesaid embodiments and, thus, will not be repeated herein. The transceiving interface 317 of the CU-CP apparatus 31 (i.e., the master communication apparatus) transmits the MAC logic channel parameter 38 and the PDCP parameter 39 to the user equipment 15 indirectly (i.e., through the DU 35a). Moreover, the transceiving interface 319 of the CU-CP apparatus 31 (i.e., the master communication apparatus) transmits the MAC logic channel parameter 38 to the DUs 35a, 35b, . . . , 35c (i.e. the data transmission apparatuses).

Herein, it is assumed that after the CU-CP apparatus 31 (i.e., the master communication apparatus) has determined at least one corresponding duplication path for each of the QoS degrees for the user equipment 15, the transceiving interface 315 receives a data stream 16 that is to be transmitted to the user equipment 15 from the core network 17. In some embodiments, each packet of the data stream 16 is duplicated into multiple copies, wherein one of the copies is transmitted by the primary path (if the instant service status of the primary path is acceptable) and the rest of the copies is/are transmitted by the duplication path(s) corresponding to the QoS degree of the data stream 16. In some embodiments, if the instant service status of the primary path is poor, the copies of each packet of the data stream 16 will be transmitted only by the duplication path(s) corresponding to the QoS degree of the data stream 16. It shall be noted that the number of copies of a packet is the same as the number of transmission paths that actually transmit the packet. In other words, if the primary path transmits the packet, the number of copies of a packet is the number of the primary path (i.e., 1) plus the number of duplication paths corresponding to the QoS degree of the data stream 16. If the primary path does not transmit the packet, the number of copies of a packet is the number of duplication paths corresponding to the QoS degree of the data stream 16.

In this embodiment, after the CU-CP apparatus 31 (i.e., the master communication apparatus) has determined at least one corresponding duplication path for each of the QoS degrees for the user equipment 15, the CU-CP apparatus 31 further determines which corresponding duplication path(s) will activated for each of the QoS degrees. Specifically, the transceiving interface 317 of the CU-CP apparatus 31 (i.e., the master communication apparatus) receives a communication service status of each of the DUs 35a, 35b, . . . , 35c. The meaning and the content of each piece of communication service status are the same as those described in the aforesaid embodiments and, thus, will not be repeated herein. The processor 311 of the CU-CP apparatus 31 (i.e., the master communication apparatus) further performs the following operation on the corresponding first set for each of the QoS degrees: selecting a second set of the at least one duplication path comprised in the first set as at least one activated duplication path according to the priority degree of each of the at least one duplication path comprised in the first set and the communication service status of each of the at least one data transmission apparatus that corresponds to the at least one duplication path comprised in the first set, wherein the second set may be the same as the first set or may be a subset of the first set. The transceiving interface 117 of the CU-CP apparatus 31 (i.e., the master communication apparatus) further transmits an activation notification message (not shown) to each of the at least one data transmission apparatus that corresponds to the at least one activated duplication path. Please note that a data transmission apparatus that corresponds to an activated duplication path includes an activated RLC entity. For better understanding, the specific example shown in FIG. 1D may be referred to.

In some embodiments, regarding the first set of each QoS degree, whether a duplication path comprised therein is activated is determined by the data transmission apparatus corresponding to the duplication path according to the communication service status thereof. Similarly, in these embodiments, a second set of the duplication paths included in the first set corresponding to each QoS degree includes the activated duplication path(s), wherein the second set may be the same as the first set or may be a subset of the first set. Similarly, the data transmission apparatus corresponding to an activated duplication paths include an activated RLC entity.

Herein, it is assumed that after the CU-CP apparatus 31 (i.e., the master communication apparatus) has determined at least one corresponding activated duplication path for each of the QoS degrees for the user equipment 15, the transceiving interface 315 receives a data stream 16 that is to be transmitted to the user equipment 15 from the core network 17. In some embodiments, each packet of the data stream 16 is duplicated into multiple copies, wherein one of the copies is transmitted by the primary path (if the instant service status of the primary path is acceptable) and the rest of the copies is/are transmitted by the activated duplication path(s) corresponding to the QoS degree of the data stream 16. In some embodiments, if the instant service status of the primary path is poor, the copies of each packet of the data stream 16 will be transmitted only by the activated duplication path(s) corresponding to the QoS degree of the data stream 16. It shall be noted that the number of copies of a packet is the same as the number of transmission paths that actually transmit the packet. In other words, if the primary path transmits the packet, the number of copies of a packet is the number of the primary path (i.e., 1) plus the number of the activated duplication paths corresponding to the QoS degree of the data stream 16. If the primary path does not transmit the packet, the number of copies of a packet is the number of the activated duplication paths corresponding to the QoS degree of the data stream 16.

In this embodiment, after the CU-CP apparatus 31 (i.e., the master communication apparatus) has determined at least one corresponding activated duplication path for each of the QoS degrees for the user equipment 15, the CU-CP apparatus 31 further determines which corresponding activated duplication path(s) will be adopted for transmission when there is a packet to be transmitted.

Herein, it is assumed that the transceiving interface 315 receives a data stream 16 that is to be transmitted to the user equipment 15 from the core network 17. The data stream 16 corresponds to one of the QoS degrees defined by the mobile communication system 3. The processor 311 of the CU-CP apparatus 31 (i.e., the master communication apparatus) ascertains the second set corresponding to the data stream 16 (i.e., ascertains the corresponding activated duplication path(s)) according to the QoS degree corresponding to the data stream 16. The transceiving interface 317 of the CU-CP apparatus 31 (i.e., the master communication apparatus) receives an instant service status (e.g., the load status, the wireless connection status, the wireless channel quality status, the buffer status, without being limited thereto) of each of the at least one data transmission apparatus that corresponds to the at least one activated duplication path included in the second set. The processor 311 of the CU-CP apparatus 31 (i.e., the master communication apparatus) further designates a third set of the at least one activated duplication path comprised in the second set as at least one adopted duplication path according to the instant service status of each of the at least one data transmission apparatus that corresponds to the at least one activated duplication path comprised in the second set, wherein the third set may be the same as the second set or may be a subset of the second set. The data transmission apparatus corresponding to any of the aforesaid adopted duplication path comprises an activated RLC entity.

Thereafter, each packet to be transmitted to the user equipment 15 in the data stream 16 is duplicated into a plurality of copies, wherein one of the copies is transmitted by the primary path (if the instant service status of the primary path is acceptable) to the user equipment 15 and the rest of the copies are transmitted to the user equipment 15 by the adopted duplication path(s) corresponding to the QoS degree of the data stream 16. In some embodiments, if the instant service status of the primary path is poor, the copies of each packet of the data stream 16 will be transmitted only by the adopted duplication path(s) corresponding to the QoS degree of the data flow 16. It shall be noted that the number of copies of a packet is the same as the number of transmission paths that actually transmit the packet. In other words, if the primary path transmits the packet, the number of copies of a packet is the number of the primary path (i.e., 1) plus the number of the adopted duplication paths corresponding to the QoS degree of the data stream 16. If the primary path does not transmit the packet, the number of copies of a packet is the number of the adopted duplication paths corresponding to the QoS degree of the data stream 16.

In some embodiments, each of the packets to be transmitted to the user equipment 15 in the data stream 16 is duplicated into multiple copies, and these copies are transmitted to the data transmission apparatus(es) corresponding to the activated duplication path(s) included in the second set corresponding to the data stream 16. Each data transmission apparatus that receives the copy of the packet then determines whether to transmit the copy of the packet to the user equipment 15 according to the instant service status thereof. In other words, a set of the data transmission apparatuses that receive the copy of the packet will transmit the copy to the user equipment 15. Any data transmission apparatus that transmit the copy of the packet to the user equipment 15 include an activated RLC entity.

Figure 4A:
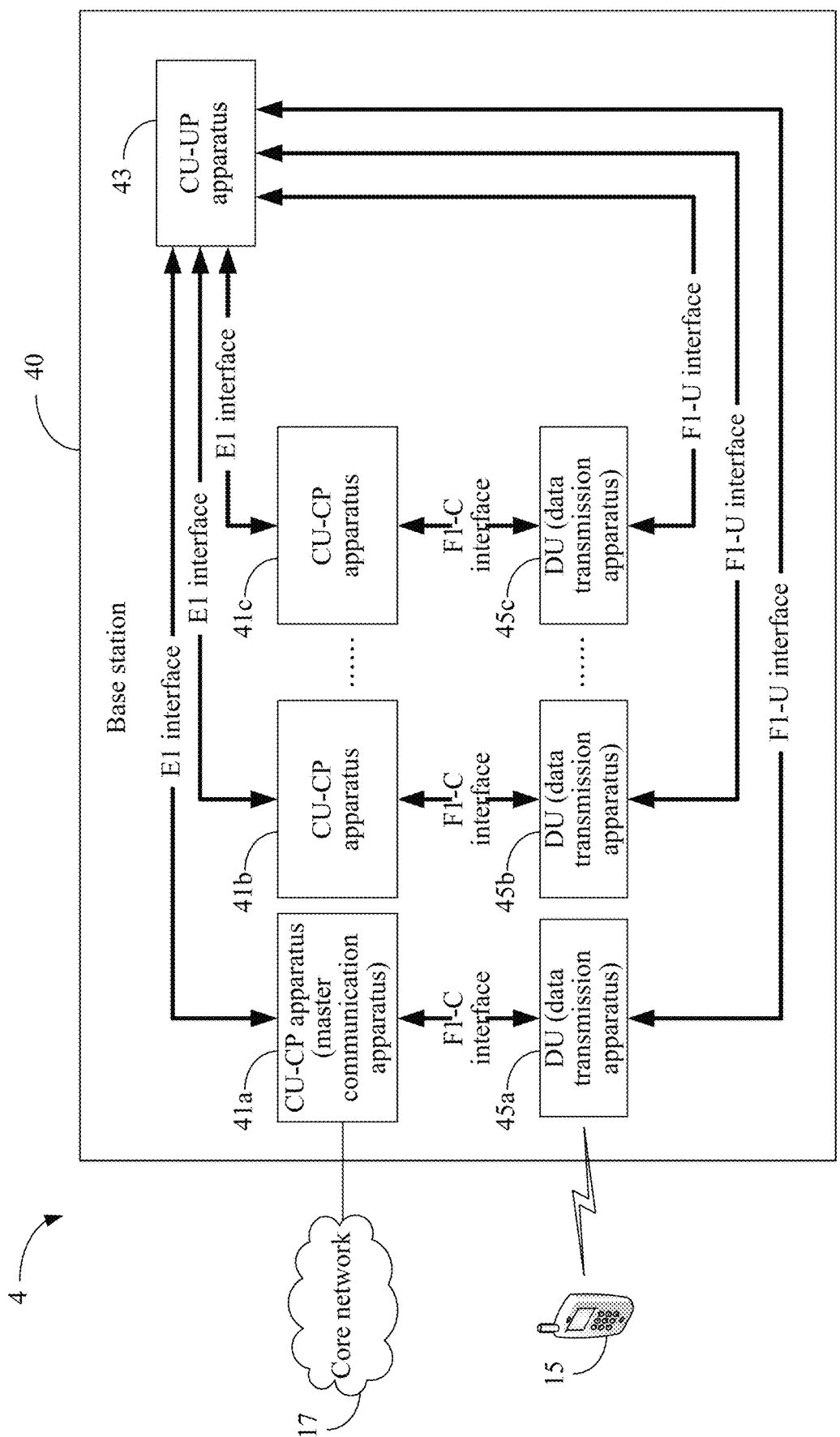
FIG. 4A depicts a schematic view of a part of the mobile communication system 4.

A fourth embodiment of the present invention is a mobile communication system 4 and a schematic view of a part of the mobile communication system 4 is depicted in FIG. 4A. The mobile communication system 4 conforms to the specification of the fifth generation of mobile communication technology and comprises a base station 40 and a core network 17. The base station 40 comprises a plurality of CU-CP apparatuses 41a, 41b, . . . , 41c, a CU-UP apparatus 43, and a plurality of DUs 45a, 45b, . . . , 45c. An E1 interface is individually established between each of the CU-CP apparatuses 41a, 41b, . . . , 41c and the CU-UP apparatus 43, an F1-C interface is individually established between each of the CU-CP apparatuses 41a, 41b, . . . , 41c and the corresponding DU (among the DUs 45a, 45b, . . . , 45c), and an F1-U interface is individually established between the CU-UP apparatus 43 and each of the DUs 45a, 45b, . . . , 45c. In this embodiment, the CU-CP apparatus 41a serves as a master communication apparatus, and each of the DUs 45a, 45b, . . . , 45c serves as a data transmission apparatus.

Figure 4B:
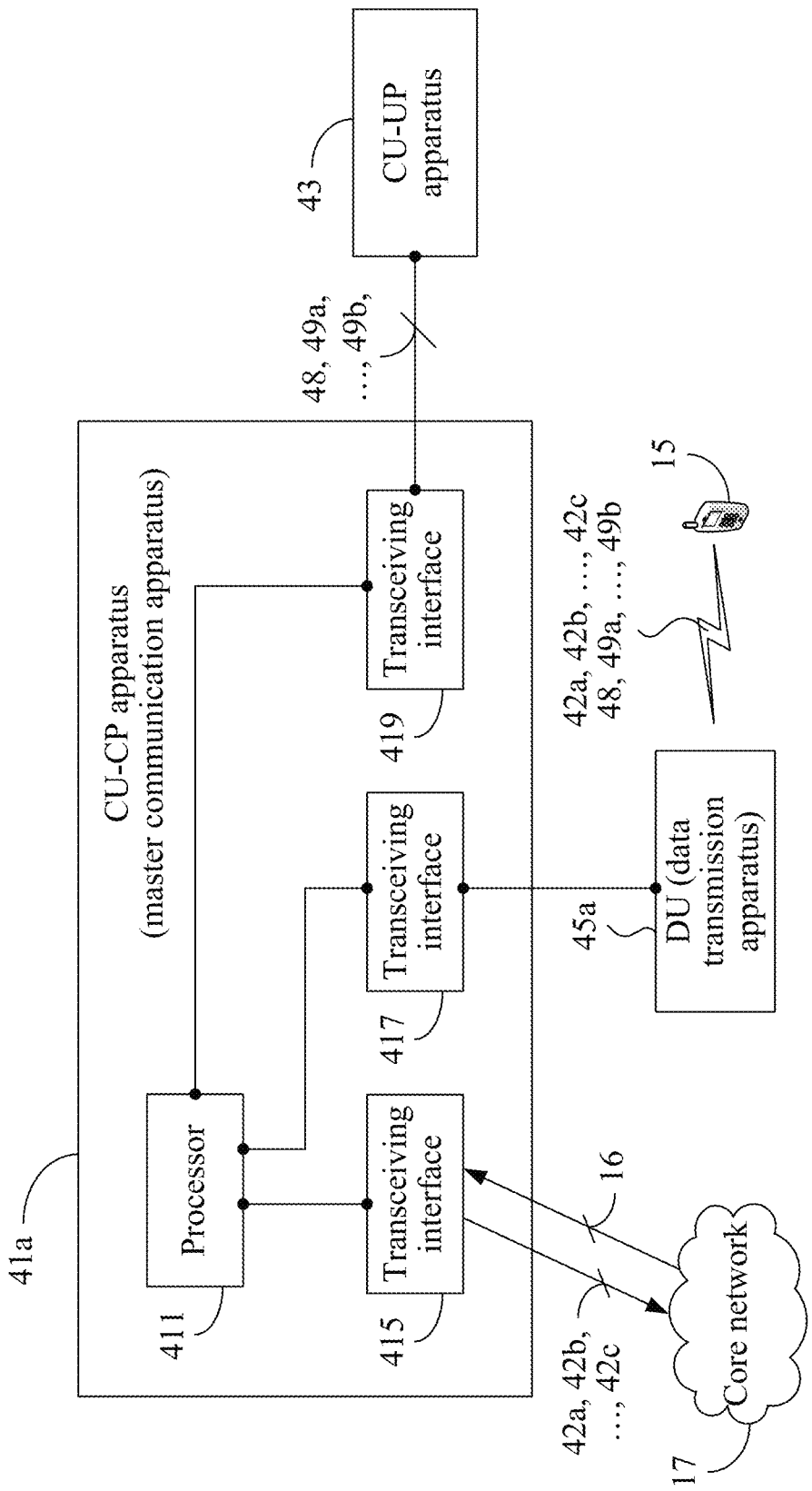

Please refer to FIG. 4B, which is a schematic view depicting the CU-CP apparatus 41a. The CU-CP apparatus 41a (i.e., the master communication apparatus) comprises a processor 411 and the transceiving interfaces 415, 417, and 419, wherein the processor 411 is electrically connected to the transceiving interfaces 415, 417, and 419. The transceiving interface 415 is electrically connected to the core network 17, the transceiving interface 417 is electrically connected to the DU 45a, and the transceiving interface 419 is electrically connected to the CU-UP apparatus 43. The processor 411 may be one of various processing units, CPUs, microprocessors, DSPs, or any other computing apparatuses with the same function and well-known to those of ordinary skill in the art. The transceiving interface 415 may be any wired or wireless interface capable of communicating with the core network, the transceiving interface 417 may be any wired or wireless interface capable of communicating with the DUs, and the transceiving interface 419 may be any wired or wireless interface capable of communicating with the CU-UP apparatus.

In this embodiment, the communication protocol stack executed by any of the CU-CP apparatuses 41a, 41b, ..., 41c comprises an RRC layer and a PDCP layer (from top to bottom), the communication protocol stack executed by the CU-UP apparatus 43 comprises an SDAP layer and a PDCP layer (from top to bottom), and the communication protocol stack executed by any of the DUs 45a, 45b, ..., 45c comprises an RLC layer, a MAC layer, and a PHY layer (from top to bottom). The E1 interface between the CU-UP apparatus 43 and any of the CU-CP apparatuses 41a, 41b, ..., 41c is established between the RRC layer and the SDAP layer. The F1-C interface between the CU-CP apparatuses 41a, 41b, ..., 41c and the corresponding DU (among the DUs 45a, 45b, ..., 45c) is established between the PDCP layer and the RLC layer. The F1-U interface between the CU-UP apparatus 43 and any of the DUs 45a, 45b, ..., 45c is established between the PDCP layer and the RLC layer.

In this embodiment, the user equipment 15 is attached to the CU-CP apparatus 41a (i.e., the master communication apparatus) through the DU 45a. Thus, a transmission path (not shown) is established between the user equipment 15 and the DU 45a. The processor 311 of the CU-CP apparatus 41a (i.e., the master communication apparatus) then reconfigures the user equipment 15 so that a transmission path is also individually established between the user equipment 15 and each of the DUs 45b, ..., 45c.

The user equipment 15 measures a plurality of communication measurement information 42a, 42b, ..., 42c respectively between the user equipment 15 and the DUs 45a, 45b, ..., 45c. The meaning and the content of each piece of communication measurement information are the same as those described in the aforesaid embodiments, and therefore will not be repeated herein. In this embodiment, the user equipment 15 transmits the pieces of communication measurement information 42a, 42b, ..., 42c to the CU-CP apparatus 41a (i.e., the master communication apparatus) through the DU 45a. The CU-CP apparatus 41a (i.e., the master communication apparatus) receives the pieces of communication measurement information 42a, 42b, ..., 42c indirectly (i.e., via the distributed unit 45a) through the transceiving interface 417, and then the transceiving interface 415a transmits the pieces of communication measurement information 42a, 42b, ..., 42c to the core network 17. In this embodiment, the core network 17 determines the priority degree (not shown) of each transmission path according to the pieces of communication measurement information 42a, 42b, ..., 42c. In some other embodiments, the core network 17 may determine the priority degree of each transmission path according to the pieces of communication measurement information 42a, 42b, ..., 42c and/or the default priority levels of the 5G QoS Indicator. Then, the core network 17 transmits the priority degree of each transmission path to the CU-CP apparatus 41a (i.e., the master communication apparatus). The CU-CP apparatus 41a (i.e., the master communication apparatus) then receives the priority degree of each transmission path through the transceiving interface 415.

The processor 411 of the CU-CP apparatus 41a (i.e., the master communication apparatus) selects one of the transmission paths as a primary path (not shown) of the user equipment 15. For a plurality of QoS degrees (not shown) defined by the mobile communication system 4, the processor 411 of the CU-CP apparatus 41a (i.e., the master communication apparatus) individually determines at least one duplication path to be used for different QoS degrees for the user equipment 15. The QoS degrees may be the 5QI values of the 5G QoS Indicator, but it is not limited thereto. Specifically, for each of the QoS degrees, the processor 411 of the CU-CP apparatus 41a (i.e., the master communication apparatus) selects a first set of the transmission paths (from the transmission paths excluding the primary path, selecting some of them as the first set) as at least one duplication path of the QoS degree for the user equipment 15 according to a first parameter set and a second parameter set, wherein the first parameter set comprises the priority degrees and the second parameter set comprises the communication service status of each of the DUs 45a, 45b, ..., 45c (i.e. the data transmission apparatuses). It shall be noted that different QoS degrees may correspond to different first set (i.e., corresponding to different duplication path(s)). For better understanding, the specific example shown in FIG. 1D may be referred to.

Please note that the DUs 45a, 45b, ..., 45c may coordinate with each other via the CU-CP apparatuses 41a, 41b, ..., 41c and then derive the communication service statuses from the corresponding the CU-CP apparatuses 41a, 41b, ..., 41c. It is also possible that the DUs 45a, 45b, ..., 45c coordinate with each other via core network 17 and then derive the communication service statuses from the core network 17. The CU-CP apparatus 41a (i.e., the master communication apparatus) receives the communication service status of each of the DUs 45a, 45b, ..., 45c via the CU-UP apparatus 43 or from the core network 17 via the transceiving interface 415. The meaning and the content of each communication service status are the similar as those described in the aforesaid embodiments and, hence, are not repeated.

Thereafter, the processor 411 of the CU-CP apparatus 41a (i.e., the master communication apparatus) configures a MAC logic channel parameter 48 (e.g., a logical channel prioritization restriction, but it is not limited thereto). It is noted that the processor 411 configures the MAC logic channel parameter 48 by the RRC layer. In addition, the processor 411 of the CU-CP apparatus 41a (i.e., the master communication apparatus) configures the PDCP parameters 49a, ..., 49b. Likewise, the processor 411 configures the PDCP parameters 49a, ..., 49b by the RRC layer. In this embodiment, the purpose of setting the PDCP parameters and the contents of the PDCP parameters are the same as those described in the aforesaid embodiments and, thus, will not be repeated herein. The transceiving interface 417 of the CU-CP apparatus 41a (i.e., the master communication apparatus) transmits the MAC logic channel parameter 48 and the PDCP parameters 49a, ..., 49b to the user equipment 15 indirectly (i.e., through the distributed unit 45a). Moreover, the transceiving interface 419 of the CU-CP apparatus 41a (i.e., the master communication apparatus) transmits the MAC logic channel parameter 48 and the PDCP parameters 49a, ..., 49b to the CU-UP apparatus 43.

Herein, it is assumed that after the CU-CP apparatus 41a (i.e., the master communication apparatus) has determined at least one corresponding duplication path for each of the QoS degrees for the user equipment 15, the transceiving interface 415 receives a data stream 16 that is to be transmitted to the user equipment 15 from the core network 17. In some embodiments, each packet of the data stream 16 is duplicated into multiple copies, wherein one of the copies is transmitted by the primary path (if the instant service status of the primary path is acceptable) and the rest of the copies is/are transmitted by the duplication path(s) corresponding to the QoS degree of the data stream 16. In some embodiments, if the instant service status of the primary path is poor, the copies of each packet of the data stream 16 will be transmitted only by the duplication path corresponding to the QoS degree of the data stream 16. It shall be noted that the number of copies of a packet is the same as the number of transmission paths that actually transmit the packet. In other words, if the primary path transmits the packet, the number of copies of a packet is the number of the primary path (i.e., 1) plus the number of duplication paths corresponding to the QoS degree of the data stream 16. If the primary path does not transmit the packet, the number of copies of a packet is the number of duplication paths corresponding to the QoS degree of the data stream 16.

In this embodiment, after the CU-CP apparatus 41a (i.e., the master communication apparatus) has determined at least one corresponding duplication path for each of the QoS degrees for the user equipment 15, the CU-CP apparatus 41a further determines which corresponding duplication path(s) will be activated for each of the QoS degrees. Specifically, the processor 411 of the CU-CP apparatus 41a (i.e., the master communication apparatus) performs the following operation on the corresponding first set of each of the QoS degrees: selecting a second set of the at least one duplication path comprised in the first set as at least one activated duplication path according to the priority degree of each of the at least one duplication path comprised in the first set and the communication service status of each of the at least one data transmission apparatus that corresponds to the at least one duplication path comprised in the first set, wherein the second set may be the same as the first set or may be a subset of the first set. The CU-CP apparatus 41a further transmits an activation notification message (not shown) to each of the at least one data transmission apparatus corresponding to the at least one activated duplication path through the CU-UP apparatus 43. Each data transmission apparatus that corresponds to an activated duplication path includes an activated RLC entity. For better understanding, the specific example shown in FIG. 1D may be referred to.

In some embodiments, regarding the first set of each QoS degree, whether a duplication path comprised therein is activated is determined by the data transmission apparatus corresponding to that duplication path according to the communication service status thereof. Similarly, in these embodiments, a second set of the duplication paths included in the first set corresponding to each QoS degree includes the activated duplication path(s), wherein the second set may be the same as the first set or may be a subset of the first set. Similarly, the data transmission apparatus that corresponds to an activated duplication path include an activated RLC entity.

Herein, it is assumed that after the CU-CP apparatus 41a (i.e., the master communication apparatus) has determined at least one corresponding activated duplication path for each of the QoS degrees for the user equipment 15, the transceiving interface 415 receives a data stream 16 that is to be transmitted to the user equipment 15 from the core network 17. In some embodiments, each packet of the data stream 16 is duplicated into multiple copies, wherein one of the copies is transmitted by the primary path (if the instant service status of the primary path is acceptable) and the rest of the copies is/are transmitted by the activated duplication path(s) corresponding to the QoS degree of the data stream 16. In some embodiments, if the instant service status of the primary path is poor, the copies of each packet of the data stream 16 will be transmitted only by the activated duplication path corresponding to the QoS degree of the data stream 16. It shall be noted that the number of copies of a packet is the same as the number of transmission paths that actually transmit the packet. In other words, if the primary path transmits the packet, the number of copies of a packet is the number of the primary path (i.e., 1) plus the number of the activated duplication paths corresponding to the QoS degree of the data stream 16. If the primary path does not transmit the packet, the number of copies of a packet is the number of the activated duplication paths corresponding to the QoS degree of the data stream 16.

In this embodiment, after the CU-CP apparatus 41a (i.e., the master communication apparatus) has determined at least one corresponding activated duplication path for each of the QoS degrees for the user equipment 15, the CU-CP apparatus 41a further determines which corresponding activated duplication path will be adopted for transmission when there is a packet to be transmitted.

Herein, it is assumed that the transceiving interface 415 receives a data stream 16 that is to be transmitted to the user equipment 15 from the core network 17. The data stream 16 corresponds to one of the QoS degrees defined by the mobile communication system 4. The processor 411 of the CU-CP apparatus 41a (i.e., the master communication apparatus) ascertains the second set corresponding to the data stream 16 (i.e., ascertains the corresponding activated duplication paths) according to the QoS degree corresponding to the data stream 16. The CU-CP apparatus 41a (i.e., the master communication apparatus) receives an instant service status (e.g., the load status, the wireless connection status, the wireless channel quality status, the buffer status, without being limited thereto) of the at least one data transmission apparatus that corresponds to the at least one activated duplication path included in the second set through the CU-UP apparatus 43. The processor 411 of the CU-CP apparatus 41a (i.e., the master communication apparatus) further designates a third set of the at least one activated duplication path comprised in the second set as at least one adopted duplication path according to the instant service status of each of the at least one data transmission apparatus that corresponds to the at least one activated duplication path comprised in the second set, wherein the third set may be the same as the second set or may be a subset of the second set. The data transmission apparatus corresponding to any of the aforesaid adopted duplication path comprises an activated RLC entity.

Thereafter, each packet to be transmitted to the user equipment 15 in the data stream 16 is duplicated into a plurality of copies, wherein one of the copies is transmitted by the primary path (if the instant service status of the primary path permits) and the rest of the copies are transmitted by the adopted duplication path corresponding to the QoS degree of the data stream 16. In some embodiments, if the instant service status of the primary path is poor, the copies of each packet of the data stream 16 will be transmitted only by the adopted duplication path. It shall be noted that the number of copies of a packet is the same as the number of transmission paths that actually transmit the packet. In other words, if the primary path transmits the packet, the number of copies of a packet is the number of the primary path (i.e., 1) plus the number of the adopted duplication paths corresponding to the QoS degree of the data stream 16. If the primary path does not transmit the packet, the number of copies of a packet is the number of the adopted duplication paths corresponding to the QoS degree of the data stream 16.

In some embodiments, each of the packets to be transmitted to the user equipment 15 in the data stream 16 is duplicated into multiple copies, and these copies are transmitted to the data transmission apparatus(es) corresponding to the activated duplication path(s) included in the second set corresponding to the data stream 16. Each data transmission apparatus that receives the copy of the packet then determines whether to transmit the copy of the packet to the user equipment 15 according to the instant service status thereof. In other words, a set of the data transmission apparatuses that receive the copy of the packet will transmit the copy to the user equipment 15. Any data transmission apparatuses that transmits the copy of the packet to the user equipment 15 include an activated RLC entity.

Figure 5A:
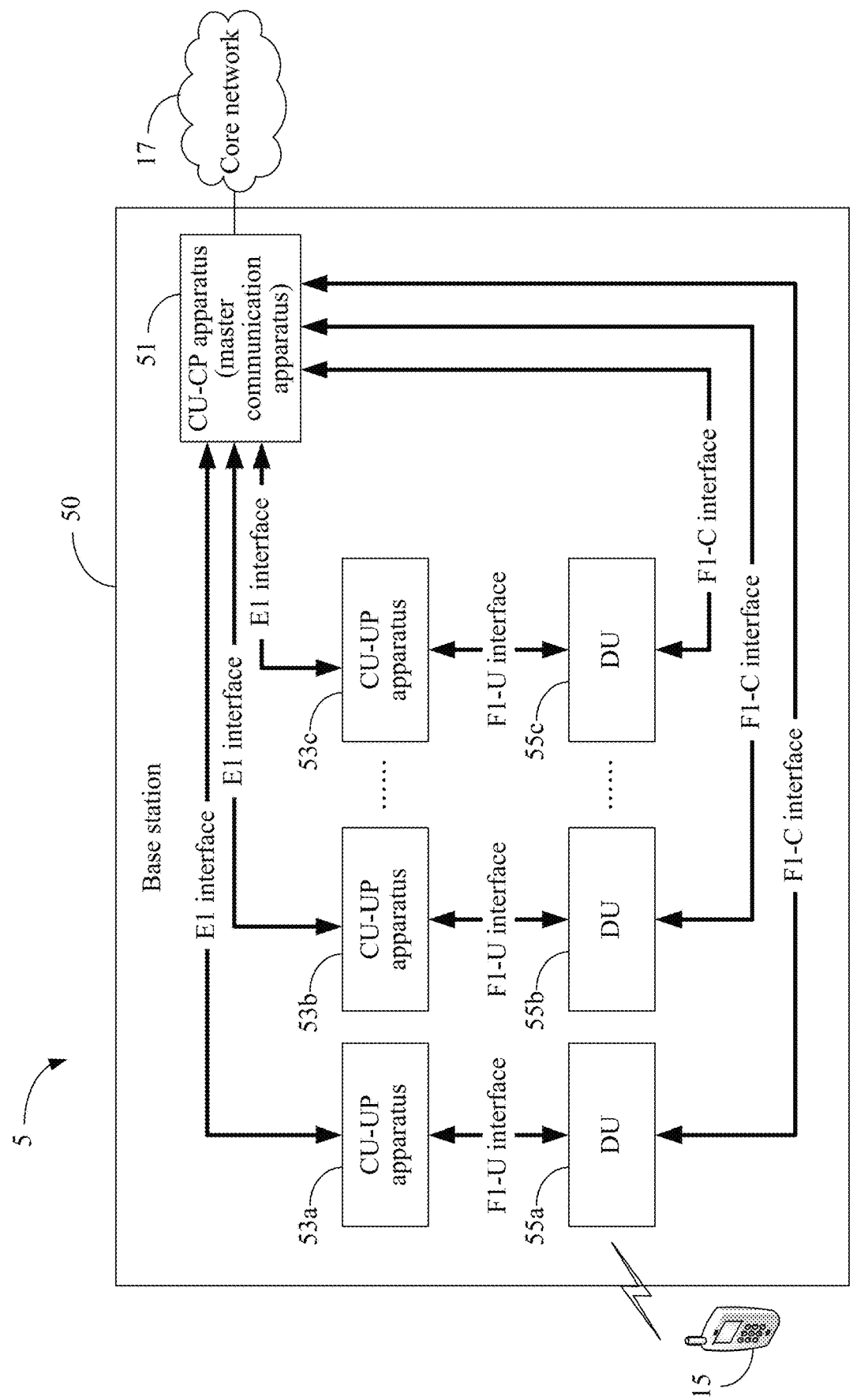
FIG. 5A depicts a schematic view of a part of the mobile communication system 5.

A fifth embodiment of the present invention is a mobile communication system 5 and a schematic view of a part of the mobile communication system 5 is depicted in FIG. 5A. The mobile communication system 5 conforms to the specification of the fifth generation of mobile communication technology and comprises a base station 50 and a core network 17. The base station 50 comprises a CU-CP apparatuses 51, a plurality of CU-UP apparatuses 53a, 53b, . . . , 53c, and a plurality of DUs 55a, 55b, . . . , 55c. An E1 interface is individually established between the CU-CP apparatus 51 and each of the CU-UP apparatuses 53a, 53b, . . . 53c, an F1-C interface is individually established between the CU-CP apparatus 51 and each of the DUs 55a, 55b, . . . , 55c, and an F1-C interface is individually established between each of the CU-UP apparatuses 53a, 53b, . . . , 53c and the corresponding DU (among the distributed units 55a, 55b, . . . , 55c). In this embodiment, the CU-CP apparatus 51 serves as a master communication apparatus, and the DUs 55a, 55b, . . . , 55c serve as a plurality of data transmission apparatuses.

Figure 5B:
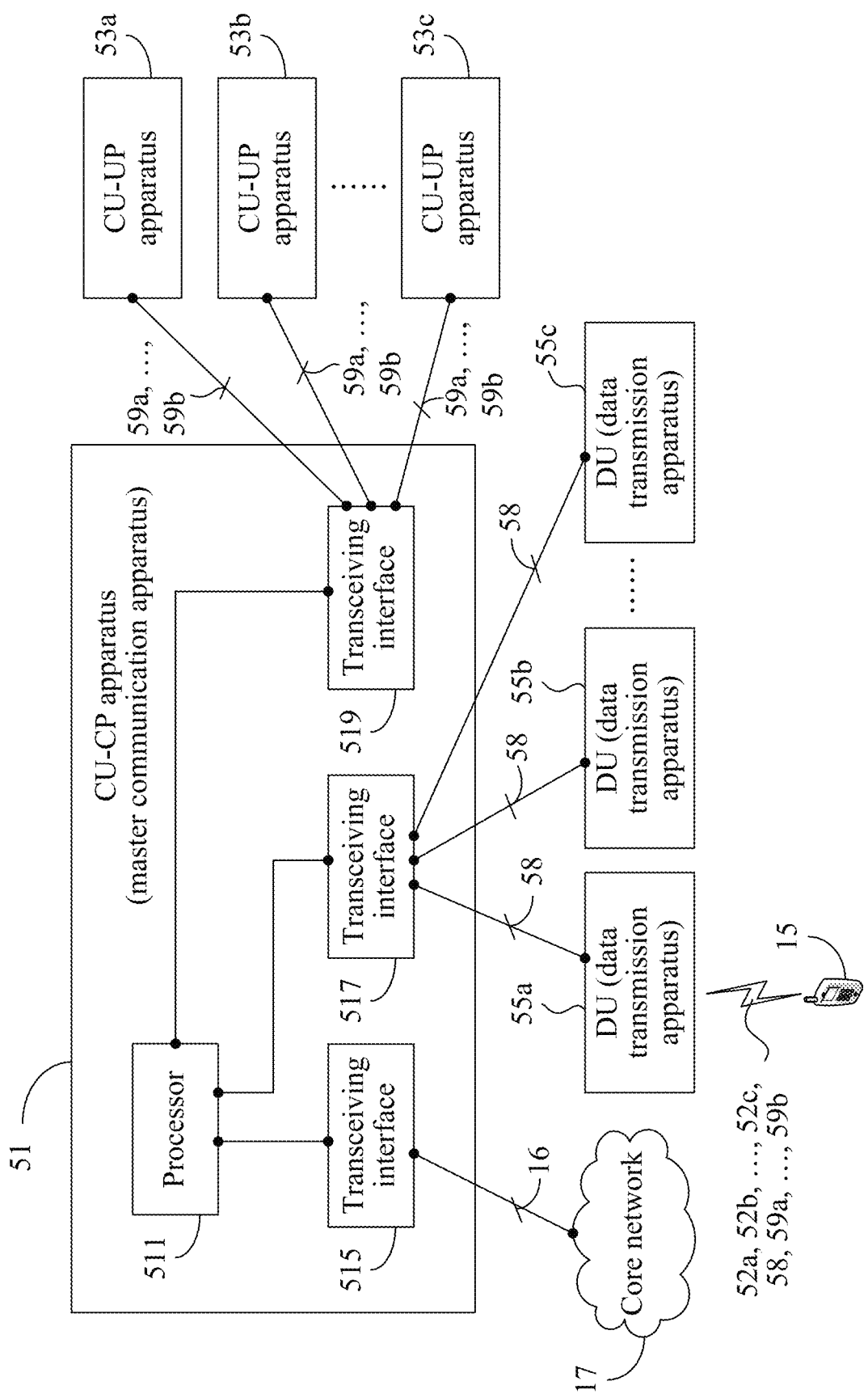
FIG. 5B depicts a schematic view of the CU-CP apparatus 51.

Please refer to FIG. 5B, which is a schematic view depicting the CU-CP apparatus 51. The CU-CP apparatus 51 (i.e., the master communication apparatus) comprises a processor 511 and the transceiving interfaces 515, 517, and 519, wherein the processor 511 is electrically connected to the transceiving interfaces 515, 517, and 519. The transceiving interface 515 is electrically connected to the core network 17, the transceiving interface 517 is electrically connected to all of the DUs 55a, 55b, . . . , 55c, and the transceiving interface 519 is electrically connected to all of the CU-UP apparatuses 53a, 53b, . . . , 53c. The processor 511 may be one of various processing units, CPUs, microprocessors, DSPs, or any other computing apparatuses with the same function and well-known to those of ordinary skill in the art. The transceiving interface 515 may be any wired or wireless interface capable of communicating with the core network, the transceiving interface 517 may be any wired or wireless interface capable of communicating with the distributed units, and the transceiving interface 519 may be any wired or wireless interface capable of communicating with the CU-UP apparatuses.

In this embodiment, the communication protocol stack executed by the CU-CP apparatus 51 comprises an RRC layer and a PDCP layer (from top to bottom), the communication protocol stack executed by any of the CU-UP apparatuses 53a, 53b, . . . , 53c comprises an SDAP layer and a PDCP layer (from top to bottom), and the communication protocol stack executed by any of the DUs 55a, 55b, . . . , 55c comprises an RLC layer, a MAC layer, and a PHY layer (from top to bottom). The E1 interface between the CU-CP apparatus 51 and any of the CU-UP apparatuses 53a, 53b, . . . , 53c is established between the RRC layer and the SDAP layer. The F1-C interface between the CU-CP apparatus 51 and each of the DUs 55a, 55b, . . . , 55c is established between the PDCP layer and the RLC layer. The F1-U interface between each of the CU-UP apparatuses 53a, 53b, . . . , 53c and the corresponding DU (among the DUs 55a, 55b, . . . , 55c) is established between the PDCP layer and the RLC layer.

In this embodiment, the user equipment 15 is attached to the CU-CP apparatus 51 (i.e., the master communication apparatus) through the DU 55a. Thus, a transmission path (not shown) is established between the user equipment 15 and the DU 55a. The processor 511 of the CU-CP apparatus 51 (i.e., the master communication apparatus) then reconfigures the user equipment 15 so that a transmission path is also individually established between the user equipment 15 and each of the DUs 55b, . . . , 55c.

The user equipment 15 measures a plurality of pieces of communication measurement information 52a, 52b, . . . , 52c respectively between the user equipment 15 and the DUs 55a, 55b, . . . , 55c. The meaning and the content of each piece of communication measurement information are the same as those described in the aforesaid embodiments and, thus, will not be repeated herein. In this embodiment, the user equipment 15 transmits the pieces of communication measurement information 52a, 52b, . . . , 52c to the CU-CP apparatus 51 (i.e., the master communication apparatus) through the DU 55a, and the CU-CP apparatus 51 (i.e., the master communication apparatus) receives the pieces of communication measurement information 52a, 52b, . . . , 52c indirectly (i.e., via the DU 55a) through the transceiving interface 517. In this embodiment, the processor 511 then determines the priority degree (not shown) of each transmission path according to the pieces of communication measurement information 52a, 52b, . . . , 52c. In some other embodiments, the processor 511 may determine the priority degree of each transmission path according to the pieces of communication measurement information 52a, 52b, . . . , 52c and/or the default priority levels of the 5G QoS Indicator.

The processor 511 of the CU-CP apparatus 51 (i.e., the master communication apparatus) selects one of the transmission paths as a primary path of the user equipment 15. For a plurality of QoS degrees (not shown) defined by the mobile communication system 5, the processor 511 of the CU-CP apparatus 51 (i.e., the master communication apparatus) individually determines at least one corresponding duplication path to be used for different QoS degrees for the user equipment 15. The QoS degrees may be the 5QI values of the 5G QoS Indicator, but it is not limited thereto. Specifically, for each of the QoS degrees, the processor 511 of the CU-CP apparatus 51 (i.e., the master communication apparatus) selects a first set of the transmission paths (from the transmission paths excluding the primary path, selecting some of them as the first set) as at least one duplication path of the QoS degree for the user equipment 15 according to a first parameter set and a second parameter set, wherein the first parameter set comprises the priority degrees and the second parameter set comprises the communication service status of each of the DUs 55a, 55b, ..., 55c (i.e. the data transmission apparatuses). It shall be noted that different QoS degrees may correspond to different first set (i.e., corresponding to different duplication path(s)). For better understanding, the specific example shown in FIG. 1D may be referred to.

Please note that the DUs 55a, 55b, ..., 55c may coordinate with each other via the CU-UP apparatuses 53a, 53b, ..., 53c and then derive the communication service statuses from the corresponding CU-UP apparatuses 53a, 53b, ..., 53c. The CU-CP apparatus 51 (i.e., the master communication apparatus) receives the communication service status of each of the DUs 55a, 55b, ..., 55c via the transceiving interface 517 or receives the communication service statuses from the core network 17 via the transceiving interface 515. The meaning and the content of each communication service status are the similar as those described in the aforesaid embodiments and, hence, are not repeated.

Thereafter, the processor 511 of the CU-CP apparatus 51 (i.e., the master communication apparatus) configures a MAC logic channel parameter 58 (e.g., a logical channel prioritization restriction, but it is not limited thereto). It is noted that the processor 511 configures the MAC logic channel parameter 58 by the RRC layer. In addition, the processor 511 of the CU-CP apparatus 51 (i.e., the master communication apparatus) configures the PDCP parameters 59a, ..., 59b. Similarly, the processor 511 configures the PDCP parameters 59a, ..., 59b by the RRC layer. In this embodiment, the purpose of configuring the PDCP parameters 59a, ..., 59b and the contents of the PDCP parameters 59a, ..., 59b are the same as those of the aforesaid embodiments, and thus will not be further described herein. The transceiving interface 517 of the CU-CP apparatus 51 (i.e., the master communication apparatus) transmits the MAC logic channel parameter 58 and the PDCP parameters 59a, ..., 59b to the user equipment 15 indirectly (i.e., through the DU 55a). Moreover, the transceiving interface 517 of the CU-CP apparatus 51 (i.e., the master communication apparatus) transmits the MAC logic channel parameter 58 to the DUs 55a, 55b, ..., 55c (i.e. the data transmission apparatuses). The transceiving interface 519 of the CU-CP apparatus 51 (i.e., the master communication apparatus) transmits the PDCP parameters 59a, ..., 59b to the CU-UP apparatus 53a, 53b, ..., 53c.

Herein, it is assumed that after the CU-CP apparatus 51 (i.e., the master communication apparatus) has determined at least one corresponding duplication path for each of the QoS degrees for the user equipment 15, the transceiving interface 515 receives a data stream 16 that is to be transmitted to the user equipment 15 from the core network 17. In some embodiments, each packet of the data stream 16 is duplicated into multiple copies, wherein one of the copies is transmitted by the primary path (if the instant service status of the primary path is acceptable) and the rest of the copies is/are transmitted by the duplication path(s) corresponding to the QoS degree of the data stream 16. In some embodiments, if the instant service status of the primary path is poor, the copies of the packets of the data stream 16 will be transmitted only by the duplication path(s) corresponding to the QoS degree of the data stream 16. It shall be noted that the number of copies of a packet is the same as the number of transmission paths that actually transmit the packet. In other words, if the primary path transmits the packet, the number of copies of a packet is the number of the primary path (i.e., 1) plus the number of duplication paths corresponding to the QoS degree of the data stream 16. If the primary path does not transmit the packet, the number of copies of a packet is the number of duplication paths corresponding to the QoS degree of the data stream 16.

In this embodiment, after the CU-CP apparatus 51 (i.e., the master communication apparatus) has determined at least one corresponding duplication path for each of the QoS degrees for the user equipment 15, the CU-CP apparatus 51 further determines which corresponding duplication path will be activated for each of the QoS degrees. Specifically, the processor 511 of the CU-CP apparatus 51 (i.e., the master communication apparatus) further performs the following operation on the corresponding first set of each of the QoS degrees: selecting a second set of the at least one duplication path comprised in the first set as at least one activated duplication path according to the priority degree of each of the at least one duplication path comprised in the first set and the communication service status of each of the at least one data transmission apparatus that corresponds to the at least one duplication path comprised in the first set, wherein the second set may be the same as the first set or may be a subset of the first set. The transceiving interface 519 of the CU-CP apparatus 51 further transmits an activation notification message (not shown) to each of the at least one data transmission apparatus that corresponds to the at least one activated duplication path. A data transmission apparatus that corresponds to an activated duplication path includes an activated RLC entity. For better understanding, the specific example shown in FIG. 1D may be referred to.

In some embodiments, regarding the first set of each QoS degree, whether a duplication path is activated is determined by the data transmission apparatus corresponding to that duplication path according to the communication service status thereof. Similarly, in these embodiments, a second set of the duplication paths included in the first set corresponding to each QoS degree includes activated duplication paths, wherein the second set may be the same as the first set or may be a subset of the first set. Similarly, the data transmission apparatus that corresponds an activated duplication path includes an activated RLC entity.

Herein, it is assumed that after the CU-CP apparatus 51 (i.e., the master communication apparatus) has determined at least one corresponding activated duplication path for each of the QoS degrees for the user equipment 15, the transceiving interface 515 receives a data stream 16 that is to be transmitted to the user equipment 15 from the core network 17. In some embodiments, each packet of the data stream 16 is duplicated into multiple copies, wherein one of the copies is transmitted by the primary path (if the instant service status of the primary path is acceptable) and the rest of the copies are transmitted by the activated duplication path corresponding to the QoS degree of the data stream 16. In some embodiments, if the instant service status of the primary path is poor, the copies of each packet of the data stream 16 will be transmitted only by the activated duplication path corresponding to the QoS degree of the data stream 16. It shall be noted that the number of copies of a packet is the same as the number of transmission paths that actually transmit the packet. In other words, if the primary path transmits the packet, the number of copies of a packet is the number of the primary path (i.e., 1) plus the number of the activated duplication paths corresponding to the QoS degree of the data stream 16. If the primary path does not transmit the packet, the number of copies of a packet is the number of the activated duplication paths corresponding to the QoS degree of the data stream 16.

In this embodiment, after the CU-CP apparatus 51 (i.e., the master communication apparatus) has determined at least one corresponding activated duplication path for each of the QoS degrees for the user equipment 15, the CU-CP apparatus 51 further determines which corresponding activated duplication path will be adopted for transmission when there is a packet to be transmitted.

Herein, it is assumed that the transceiving interface 515 receives a data stream 16 that is to be transmitted to the user equipment 15 from the core network 17. The data stream 16 corresponds to one of the QoS degrees defined by the mobile communication system 5. The processor 511 of the CU-CP apparatus 51 (i.e., the master communication apparatus) ascertains the second set corresponding to the data stream 16 (i.e., ascertains the corresponding activated duplication paths) according to the QoS degree corresponding to the data stream 16. The transceiving interface 517 of the CU-CP apparatus 51 (i.e., the master communication apparatus) receives an instant service status (e.g., the load status, the wireless connection status, the wireless channel quality status, the buffer status, without being limited thereto) of each of the at least one data transmission apparatus that corresponds to the at least one activated duplication path included in the second set. The processor 511 of the CU-CP apparatus 51 (i.e., the master communication apparatus) further designates a third set of the at least one activated duplication path comprised in the second set as at least one adopted duplication path according to the instant service status of each of the at least one data transmission apparatus that corresponds to the at least one activated duplication path comprised in the second set, wherein the third set may be the same as the second set or may be a subset of the second set. A data transmission apparatus that corresponds to an adopted duplication path comprises an activated RLC entity.

Thereafter, each packet to be transmitted to the user equipment 15 in the data stream 16 is duplicated into a plurality of copies, wherein one of the copies is transmitted by the primary path (if the instant service status of the primary path is acceptable) and the rest of the copies are transmitted by the adopted duplication path corresponding to the QoS degree of the data stream 16. In some embodiments, if the instant service status of the primary path is poor, the copies of each packet of the data stream 16 will be transmitted only by the adopted duplication path corresponding to the QoS degree of the data flow 16. It shall be noted that the number of copies of a packet is the same as the number of transmission paths that actually transmit the packet. In other words, if the primary path transmits the packet, the number of copies of a packet is the number of the primary path (i.e., 1) plus the number of the adopted duplication paths corresponding to the QoS degree of the data stream 16. If the primary path does not transmit the packet, the number of copies of a packet is the number of the adopted duplication paths corresponding to the QoS degree of the data stream 16.

In some embodiments, each of the packets to be transmitted to the user equipment 15 in the data stream 16 is duplicated into multiple copies, and these copies are transmitted to the data transmission apparatus(es) corresponding to the activated duplication path(s) included in the second set corresponding to the data stream 16. Each of the data transmission apparatuses that receives the copy of the packet then determines whether to transmit the copy of the packet to the user equipment 15 according to the instant service status thereof. In other words, a set of the data transmission apparatuses that receive the copy of the packet will transmit the copy of the packet to the user equipment 15. Any data transmission apparatus that transmits the copy of the packet to the user equipment 15 includes an activated RLC entity.

According to the descriptions of the above embodiments, when the user equipment 15 has more than two transmission paths in a mobile communication system, the master communication apparatus of the present invention selects one of the transmission paths as a primary path. Furthermore, for different QoS degrees, the master communication apparatus individually selects a set of the transmission paths as at least one duplication path. After the master communication apparatus has determined the duplication paths corresponding to each of the QoS degrees for the user equipment 15, the master communication apparatus of the present invention may further determine which duplication path(s) will be activated for each of the QoS degrees. When a packet of a data stream needs to be transmitted to the user equipment 15, the master communication apparatus of the present invention further determines the duplication path to be actually adopted from the activated duplication paths according to the QoS degree of the data stream. Each packet of the data stream will be duplicated into multiple copies, and these copies will be transmitted to the user equipment 15 by the primary path and the actually adopted duplication paths.

According to the master communication apparatus of the present invention, it is possible that not all the transmission paths allocated to the user equipment are selected as the actually adopted duplication paths. Therefore, the strict requirements of ultra-reliability and low delay communications can be achieved without wasting system resources. In addition, the master communication apparatus of the present invention individually determines the duplication paths and the subsequent activation and adoption of these duplication paths for different QoS degrees. According to the present invention, it is possible that the duplication paths corresponding to different QoS degrees are not all the same and the subsequent activations and/or adoptions of duplication paths are not all the same. Hence, the resource waste and resource conflict at the lower layer of the communication protocol stack can be reduced. Furthermore, since the master communication apparatus of the present invention duplicates a packet into a plurality of copies at the upper layer of the communication protocol stack and then transmits these packets through the primary path and the duplication paths, modulation and coding pressure at the lower layer of the communication protocol stack will not be increased.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A master communication apparatus, the master communication apparatus belonging to a mobile communication system, the mobile communication system comprising a plurality of data transmission apparatuses, each of the data transmission apparatuses having a transmission path with a user equipment individually, each of the transmission paths having a priority degree, the master communication apparatus comprising:
   a first transceiving interface; and
   a processor, being electrically connected to the first transceiving interface and configured to select one of the transmission paths as a primary path, wherein for each of a plurality of Quality of Service (QoS) degrees, the processor individually selects a first set of the transmission paths as at least one duplication path of the QoS degree according to at least one of a first parameter set and a second parameter set, wherein the first parameter set comprises the priority degrees and the second parameter set comprises a communication service status of each of the at least one data transmission apparatus, wherein the processor further configures a Medium Access Control (MAC) logic channel parameter and configures at least one Packet Data Convergence Protocol (PDCP) parameter, wherein the first transceiving interface further transmits the at least one PDCP parameter and the MAC logic channel parameter to the user equipment.

2. The master communication apparatus of claim 1, further comprising:

a second transceiving interface, being electrically connected to the processor and configured to receive the communication service status from the corresponding data transmission apparatus.

3. The master communication apparatus of claim 1, wherein the first transceiving interface further receives a plurality of pieces of communication measurement information measured by the user equipment, each of the pieces of communication measurement information corresponds to one of the data transmission apparatuses, and the processor further determines the priority degree of each of the transmission paths according to the pieces of communication measurement information.

4. The master communication apparatus of claim 1, wherein the first transceiving interface further receives a plurality of pieces of communication measurement information measured by the user equipment, each of the pieces of communication measurement information corresponds to one of the data transmission apparatuses, and the master communication apparatus further comprises:

a second transceiving interface, being electrically connected to the processor and configured to transmit the pieces of communication measurement information to a core network and receive the priority degree of each of the transmission paths from the core network.

5. The master communication apparatus of claim 1, wherein the processor further performs the following operation for the first set of each of the QoS degrees:

selecting a second set of the at least one duplication path comprised in the first set as at least one activated duplication path according to the priority degree and the communication service status of each of the at least one duplication path comprised in the first set.

6. The master communication apparatus of claim 5, wherein each of the at least one data transmission apparatus that corresponds to one of the at least one activated duplication path comprises an activated Radio Link Control (RLC) entity, and the master communication apparatus further comprises:

a second transceiving interface, being electrically connected to the processor and configured to receive a data stream from the core network, wherein the data stream corresponds to one of the QoS degrees, wherein at least one packet of the data stream is transmitted by the at least one activated duplication path comprised in the second set that corresponds to the QoS degree of the data stream.

7. The master communication apparatus of claim 5, further comprising:

a second transceiving interface, being electrically connected to the processor and configured to receive a data stream from the core network, wherein the data stream corresponds to one of the QoS degrees, wherein the processor further ascertains the second set that corresponds to the data stream according to the QoS degree of the data stream, and the processor further designates a third set of the at least one activated duplication path comprised in the second set to transmit at least one packet of the data stream according to an instant service status of each of the at least one data transmission apparatus that corresponds to the at least one activated duplication path comprised in the second set.

8. The master communication apparatus of claim 1, wherein the master communication apparatus is one of the data transmission apparatuses, the master communication apparatus belongs to a Master Cell Group (MCG), and each of the rest data transmission apparatuses belongs to a Secondary Cell Group (SCG).

9. The master communication apparatus of claim 1, wherein the mobile communication system comprises a Centralized Unit (CU) and a plurality of Distributed Units (DUs), and an F1 interface is individually established between each of the DUs and the CU, wherein the master communication apparatus is the CU and the data transmission apparatuses are the DUs.

10. The master communication apparatus of claim 1, wherein the mobile communication system comprises a CU-Control Plane (CP) apparatus, a CU-User Plane (UP) apparatus, and a plurality of DUs, wherein an E1 interface is established between the CU-CP apparatus and the CU-UP apparatus, an F1-C interface is individually established between each of the DUs and the CU-CP apparatus, and an F1-U interface is individually established between each of the DUs and the CU-UP apparatus, wherein the master communication apparatus is the CU-CP apparatus, and the data transmission apparatuses are the DUs.

11. The master communication apparatus of claim 1, wherein the mobile communication system comprises a plurality of CU-CP apparatuses, a CU-UP apparatus, and a plurality of DUs, wherein an E1 interface is individually established between each of the CU-CP apparatuses and the CU-UP apparatus, an F1-C interface is individually established between each of the CU-CP apparatuses and the corresponding DU, and an F1-U interface is individually established between each of the DUs and the CU-UP apparatus, wherein the master communication apparatus is one of the CU-CP apparatuses, and the data transmission apparatuses are the DUs.

12. The master communication apparatus of claim 1, wherein the mobile communication system comprises a CU-CP apparatus, a plurality of CU-UP apparatuses, and a plurality of DUs, wherein an E1 interface is individually established between each of the CU-UP apparatuses and the CU-CP apparatus, an F1-C interface is individually established between each of the DUs and the CU-CP apparatus, and an F1-U interface is individually established between each of the CU-UP apparatuses and the corresponding DU, wherein the master communication apparatus is the CU-CP apparatus, and the data transmission apparatuses are the DUs.

13. A base station, comprising:
a master communication apparatus; and
a plurality of data transmission apparatuses,
wherein each of the data transmission apparatuses has a transmission path with a user equipment individually, and each of the transmission paths has a priority degree,
wherein the master communication apparatus selects one of the transmission paths as a primary path,
wherein for each of a plurality QoS degrees, the master communication apparatus individually selects a first set of the transmission paths as at least one duplication path of the QoS degree according to at least one of a first parameter set and a second parameter set, wherein the first parameter set comprises the priority degrees and the second parameter set comprises a communication service status of each of the at least one data transmission apparatus,
wherein the master communication apparatus further configures a MAC logic channel parameter, configures at least one PDCP parameter, and transmits the at least one PDCP parameter and the MAC logic channel parameter to the user equipment.

14. The base station of claim 13, wherein the master communication apparatus further receives the communication service status from the corresponding data transmission apparatus.

15. The base station of claim 13, wherein the master communication apparatus further receives a plurality of pieces of communication measurement information measured by the user equipment, each of the pieces of communication measurement information corresponds to one of the data transmission apparatuses, and the master communication apparatus further determines the priority degree of each of the transmission paths according to the pieces of communication measurement information.

16. The base station of claim 13, wherein the master communication apparatus further receives a plurality of pieces of communication measurement information measured by the user equipment, each of the pieces of communication measurement information corresponds to one of the data transmission apparatuses, the master communication apparatus further transmits the pieces of communication measurement information to a core network, and the master communication apparatus further receives the priority degree of each of the transmission paths from the core network.

17. The base station of claim 13, wherein the master communication apparatus further performs the following operation for the first set of each of the QoS degrees:
selecting a second set of the at least one duplication path comprised in the first set as at least one activated duplication path according to the priority degree and the communication service status of each of the at least one duplication path comprised in the first set,
wherein the master communication apparatus further transmits an activation notification message to each of the data transmission apparatus that corresponds to one of the at least one activated duplication path.

18. The base station of claim 17, wherein each of the at least one data transmission apparatus that corresponds to one of the at least one activated duplication path comprises an activated RLC entity, the master communication apparatus further receives a data stream from the core network, the data stream corresponds to one of the QoS degrees, and at least one packet of the data stream is transmitted by the at least one activated duplication path comprised in the second set that corresponds to the QoS degree of the data stream.

19. The base station of claim 17, wherein the master communication apparatus further receives a data stream from the core network, the data stream corresponds to one of the QoS degrees, the master communication apparatus further ascertains the second set that corresponds to the data stream according to the QoS degree of the data stream, the master communication apparatus further designates a third set of the at least one activated duplication path comprised in the second set to transmit at least one packet of the data stream according to an instant service status of each of the at least one data transmission apparatus that corresponds to the at least one activated duplication path comprised in the second set.

20. The base station of claim 13, wherein for each of the QoS degrees, a second set of the at least one duplication path comprised in the first set that corresponds to the QoS degree is at least one activated duplication path of the QoS degree, wherein each of the activated duplication path is activated by the corresponding data transmission apparatus according to a communication service status.

21. The base station of claim 20, wherein each of the at least one data transmission apparatus that corresponds to one of the at least one activated duplication path comprises an activated RLC entity, a data stream corresponds to one of the QoS degrees, and the at least one data transmission apparatus that corresponds to the second set of the QoS degree that corresponds to the data stream receives at least one packet of the data stream and transmits the at least one packet.

22. The base station of claim 20, wherein a data stream corresponds to one of the QoS degrees, and the at least one data transmission apparatus that corresponds to the second set of the QoS degree that corresponds to the data stream receives at least one packet of the data stream,
wherein the at least one data transmission apparatus that receives the at least one packet determines a third set of the at least one data transmission apparatus that receives the at least one packet to transmit the at least one packet according to at least one instant service status of the at least one data transmission apparatus that receives the at least one packet.

23. The base station of claim 13, wherein the master communication apparatus is a CU, each of the data transmission apparatuses is a DU, and an F1 interface is individually established between each of the DUs and the CU.

24. The base station of claim 13, wherein the master communication apparatus is a CU-CP apparatus, each of the data transmission apparatuses is a DU, the base station further comprises a CU-UP apparatus, an E1 interface is established between the CU-CP apparatus and the CU-UP apparatus, an F1-C interface is individually established between each of the DUs and the CU-CP apparatus, and an F1-U interface is individually established between each of the DUs and the CU-UP apparatus.

25. The base station of claim 13, wherein the base station comprises a plurality of CU-CP apparatuses and a CU-UP apparatus, the master communication apparatus is one of the CU-CP apparatuses, and each of the data transmission apparatuses is a DU,
wherein an E1 interface is individually established between each of the CU-CP apparatuses and the CU-UP apparatus, an F1-C interface is individually established between each of the CU-CP apparatuses and the corresponding DU, and an F1-U interface is individually established between each of the DUs and the CU-UP apparatus.

26. The base station of claim 13, wherein the master communication apparatus is a CU-CP apparatus, each of the data transmission apparatuses is a DU, and the base station further comprises a plurality of CU-UP apparatuses,
    wherein an E1 interface is individually established between each of the CU-UP apparatuses and the CU-CP apparatus, an F1-C interface is individually established between each of the DUs and the CU-CP apparatus, and an F1-U interface is individually established between each of the CU-UP apparatuses and the corresponding DU.

\* \* \* \* \*